US012650907B2

(12) United States Patent
Betsuno et al.

(10) Patent No.: US 12,650,907 B2
(45) Date of Patent: Jun. 9, 2026

(54) STORAGE SYSTEM AND FAILURE HANDLING METHOD IN STORAGE SYSTEM

(71) Applicant: Hitachi Vantara, Ltd., Yokohama (JP)

(72) Inventors: Kenichi Betsuno, Tokyo (JP); Norio Shimozono, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/828,495

(22) Filed: Sep. 9, 2024

(65) Prior Publication Data

US 2025/0238335 A1      Jul. 24, 2025

(30) Foreign Application Priority Data

Jan. 24, 2024     (JP) ................................. 2024-008734

(51) Int. Cl.
G06F 11/20         (2006.01)
G06F 11/1471       (2026.01)
G06F 11/16         (2006.01)
(52) U.S. Cl.
CPC ...... G06F 11/2092 (2013.01); G06F 11/1471 (2013.01); G06F 11/1662 (2013.01)
(58) Field of Classification Search
CPC ............. G06F 11/1471; G06F 11/1658; G06F 11/2028; G06F 11/2053; G06F 11/2069; G06F 11/2076; G06F 11/2082; G06F 11/2092
See application file for complete search history.

(56) References Cited

U.S. PATENT DOCUMENTS

| | | | |
|---|---|---|---|
| 6,553,509 B1 * | 4/2003 | Hanson ............... | G06F 11/1471 |
| | | | 714/E11.13 |
| 10,083,100 B1 | 9/2018 | Agetsuma et al. | |
| 2018/0285219 A1 * | 10/2018 | Donlan ............... | G06F 11/1662 |
| 2019/0163593 A1 * | 5/2019 | Agetsuma ........... | G06F 11/3034 |
| 2019/0278676 A1 * | 9/2019 | Zou ........................ | G06F 3/0647 |
| 2020/0097204 A1 * | 3/2020 | Sato ...................... | G06F 11/203 |
| 2020/0409583 A1 * | 12/2020 | Kusters ............... | G06F 11/1612 |
| 2022/0261321 A1 * | 8/2022 | Zakharkin ........... | G06F 11/1451 |
| 2022/0404977 A1 * | 12/2022 | Ito ........................... | G06F 3/065 |

FOREIGN PATENT DOCUMENTS

JP          2019-101703 A          6/2019

* cited by examiner

Primary Examiner — Marc Duncan
Assistant Examiner — Albert Li
(74) Attorney, Agent, or Firm — MATTINGLY & MALUR, PC

(57) ABSTRACT

In a storage system including a plurality of storage nodes and a plurality of storage devices that provide storage areas to the storage nodes, a cluster control unit that has detected occurrence of a failure in another storage node requests an external control device to execute a detach process of detaching a storage device allocated to a failure storage node from the failure storage node and an attach process of allocating the storage device to an alternative storage node. Then, the alternative cluster control unit restores, based on a log stored in a storage device allocated to a storage node in which a most recent failure has occurred among the storage nodes belonging to the same redundancy group as a failure storage control unit of the failure storage node, storage content of a memory of the alternative storage node.

9 Claims, 17 Drawing Sheets

| NODE ID | STATE | FAILURE OCCURRENCE DATE AND TIME |
|---------|-------|----------------------------------|
| 451 | 452 | 453 |
| 1 | NORMAL | - |
| 2 | ABNORMAL | 2023/1/2 12:34:56 |
| 3 | NORMAL | - |
| 4 | NORMAL | - |
| ... | ... | ... |

| STORAGE CONTROL UNIT ID | STATE | REDUNDANCY GROUP ID | OPERATING NODE ID |
|-------------------------|-------|---------------------|-------------------|
| 461 | 462 | 463 | 464 |
| 1 | NORMAL (ACTIVE) | 1 | 1 |
| 2 | ABNORMAL | 1 | 2 |
| 3 | ABNORMAL | 2 | 2 |
| 4 | NORMAL (STANDBY) | 2 | 1 |
| ... | ... | ... | ... |

*FIG. 14*

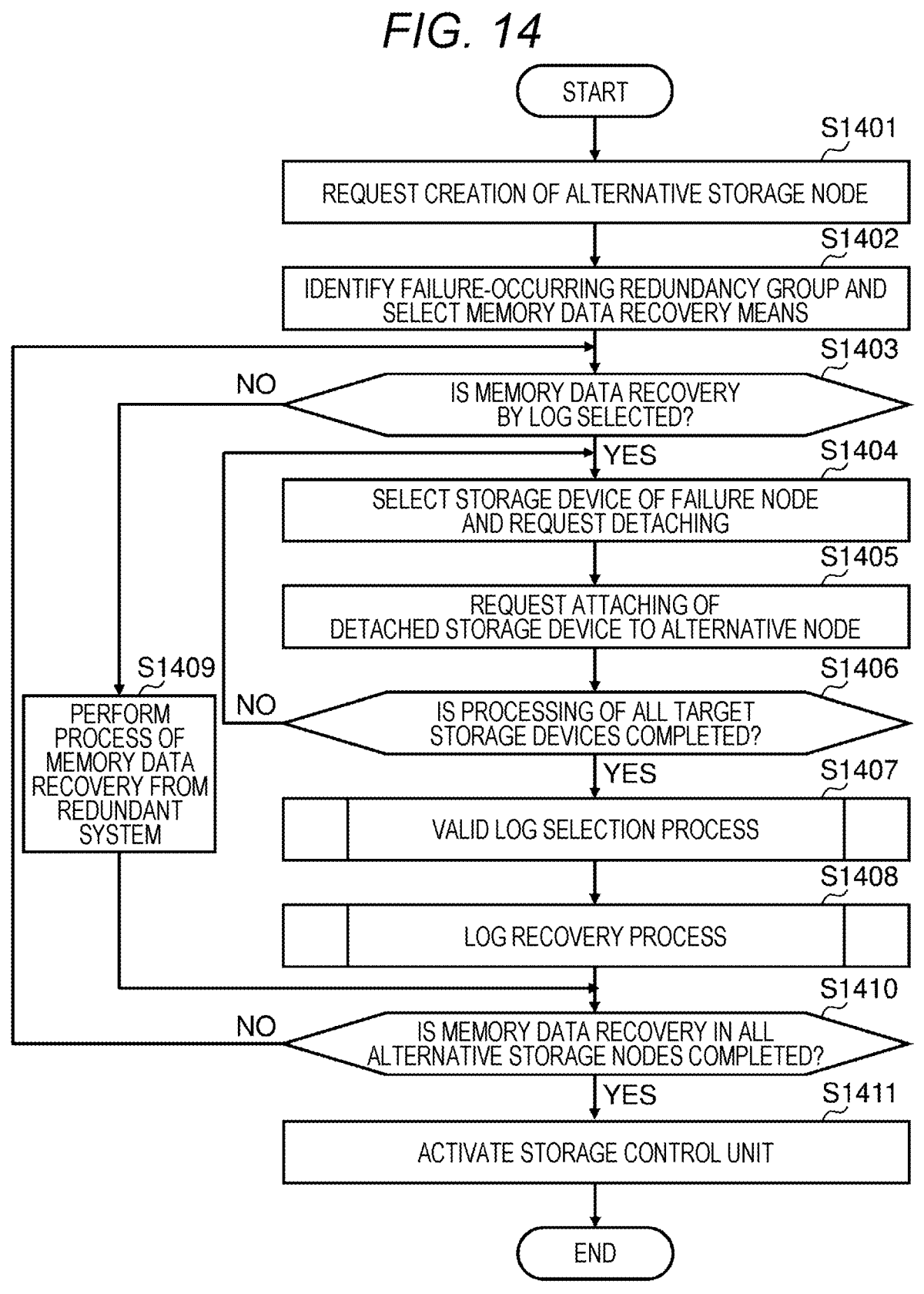

START

S1401
REQUEST CREATION OF ALTERNATIVE STORAGE NODE

S1402
IDENTIFY FAILURE-OCCURRING REDUNDANCY GROUP AND SELECT MEMORY DATA RECOVERY MEANS

S1403
IS MEMORY DATA RECOVERY BY LOG SELECTED? — NO

YES

S1404
SELECT STORAGE DEVICE OF FAILURE NODE AND REQUEST DETACHING

S1405
REQUEST ATTACHING OF DETACHED STORAGE DEVICE TO ALTERNATIVE NODE

S1406
IS PROCESSING OF ALL TARGET STORAGE DEVICES COMPLETED? — NO

YES

S1409
PERFORM PROCESS OF MEMORY DATA RECOVERY FROM REDUNDANT SYSTEM

S1407
VALID LOG SELECTION PROCESS

S1408
LOG RECOVERY PROCESS

S1410
IS MEMORY DATA RECOVERY IN ALL ALTERNATIVE STORAGE NODES COMPLETED? — NO

YES

S1411
ACTIVATE STORAGE CONTROL UNIT

END

FIG. 18

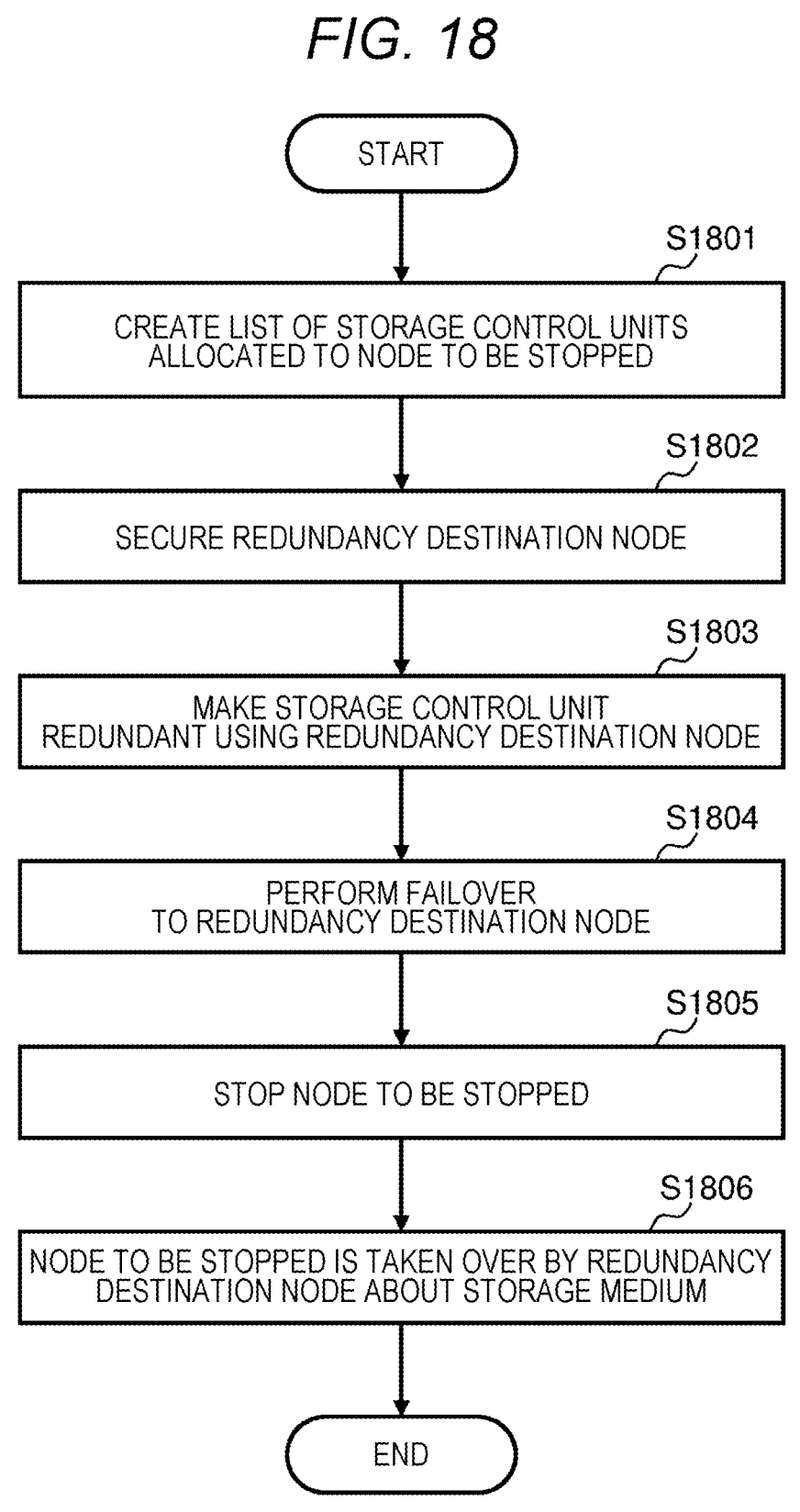

START

S1801

CREATE LIST OF STORAGE CONTROL UNITS
ALLOCATED TO NODE TO BE STOPPED

S1802

SECURE REDUNDANCY DESTINATION NODE

S1803

MAKE STORAGE CONTROL UNIT
REDUNDANT USING REDUNDANCY DESTINATION NODE

S1804

PERFORM FAILOVER
TO REDUNDANCY DESTINATION NODE

S1805

STOP NODE TO BE STOPPED

S1806

NODE TO BE STOPPED IS TAKEN OVER BY REDUNDANCY
DESTINATION NODE ABOUT STORAGE MEDIUM

END

STORAGE SYSTEM AND FAILURE HANDLING METHOD IN STORAGE SYSTEM

CROSS-REFERENCE TO RELATED APPLICATION

The present application claims priority from Japanese application JP2024-008734, filed on Jan. 24, 2024, the content of which is hereby incorporated by reference into this application.

BACKGROUND OF THE INVENTION

1. Field of the Invention

The present invention relates to a storage system and a failure handling method in the storage system.

2. Description of the Related Art

In the related art, in a storage system, a redundant configuration is often employed to improve availability and reliability.

For example, JP 2019-101703 A proposes a storage system having the following redundant configuration. That is, the storage system includes one or a plurality of storage devices that provide a storage area to each storage node included in the storage system, and one or a plurality of storage control units in which storage control software that reads and writes data from and to the storage device in response to a request from the host device operates. Each storage control unit holds storage configuration information necessary for reading and writing data from and to a corresponding storage device in response to a request from the host device.

In this storage system, a plurality of pieces of storage control software is managed as one redundancy group. The plurality of pieces of storage control software configuring the same redundancy group are disposed in different storage nodes such that the configuration information held by the respective pieces of storage control software is updated in synchronization and the loads of the respective storage nodes are distributed.

In the related art disclosed in JP 2019-101703 A, storage control software of a working system (active) belonging to a certain redundancy group and storage control software of a standby system (standby) belonging to another redundancy group are disposed in the same storage node. As a result, the availability of the storage control software can be enhanced while efficiently using the resources of the storage node.

Further, J P 2019-101703 A discloses that information on a memory necessary for controlling the storage control software is made redundant between the storage control software of the working system and the storage control software of the standby system. The information on the memory also includes cache data. As a result, it is possible to construct a storage system capable of continuing reading and writing even when a storage node fails, using a software defined storage (SDS).

SUMMARY OF THE INVENTION

However, in the related art described above, when all the storage control software of the same redundancy group is inoperable due to a failure of the storage node, there is a problem that dirty data not stored in the storage device among the write data processed by the storage control software is lost. When the dirty data in which the writing to the storage system is completed (the write completion is responded) is lost, the reliability of the storage system is greatly impaired.

Therefore, by increasing the number of control software belonging to the same redundancy group, it is possible to reduce the possibility that all the storage control software of the same redundancy group cannot be operated at the same time, and improve the reliability of the storage system. However, since each storage control software is required to hold information on the memory, there is a problem that the capacity efficiency of the memory of the storage system decreases.

The present invention has been made in view of the above circumstances, and an object thereof is to ensure high reliability while maintaining capacity efficiency of a memory in a storage system.

In order to solve the above problem and achieve an object of the present invention, a storage system includes a plurality of storage nodes, and a plurality of storage devices that provides storage areas to the plurality of storage nodes, wherein each of the storage nodes includes a memory that stores cache data related to data read from and written to the storage areas by the each storage node, a storage control unit that reads and writes the data from and to the storage areas in response to a request from a host device, updates the cache data related to the data in the memory, creates a log related to the cache data, and stores the log in a storage device allocated to the each storage node, and a cluster control unit that manages a plurality of the storage control units in a redundancy group, dispersedly arranges and manages the plurality of storage control units belonging to the same redundancy group in the plurality of storage nodes, and monitors occurrence of a failure in another storage node, the storage control units belonging to the same redundancy group synchronize the cache data stored in the memory, a failure detection cluster control unit that is the cluster control unit that has detected the occurrence of the failure in the other storage node requests an external control device to create an alternative storage node that is the storage node that substitutes for a failure storage node that is the storage node in which the failure has occurred, the failure detection cluster control unit executes a detach process of separating the storage device allocated to the failure storage node from the failure storage node, then requests the control device to execute an attach process of allocating the storage device to the alternative storage node, and an alternative cluster control unit that is the cluster control unit included in the alternative storage node selects a specific storage node in which a most recent failure has occurred among the storage nodes including the storage control units belonging to the same redundancy group as a failure storage control unit included in the failure storage node, selects and executes, based on the log stored in the storage device allocated to the specific storage node, a first recovery method of restoring storage content in the memory included in the alternative storage node, and activates an alternative storage control unit that is the storage control unit substituting for the failure storage control unit in the alternative storage node.

According to the present invention, in the storage system, high reliability can be secured while maintaining the capacity efficiency of the memory.

BRIEF DESCRIPTION OF THE DRAWINGS

FIG. 4 is a diagram for describing a storage node management table according to the first embodiment;

FIG. 5 is a diagram illustrating a storage control unit management table according to the first embodiment;

FIG. 14 is a flowchart of a system recovery process according to first embodiment;

FIG. 18 is a flowchart of a storage node maintenance stop process according to the third embodiment.

DESCRIPTION OF THE PREFERRED EMBODIMENTS

Hereinafter, an embodiment of the present invention will be described based on the drawings. In the accompanying drawings, functionally the same elements may be represented by the same numbers. The accompanying drawings illustrate specific embodiments and examples in accordance with the principles of the present invention. The embodiments and examples are for the understanding of the present invention and should not be used for the restrictive interpretation of the present invention.

In addition, in the following description, in a case where the same types of elements are described without being distinguished, a common code among the reference codes may be used, and in a case where the same types of elements are distinguished, a reference code (or an ID (for example, an identification number) of the elements) may be used.

First Embodiment

<Configuration of Storage System 1 According to First Embodiment>

Figure 1:
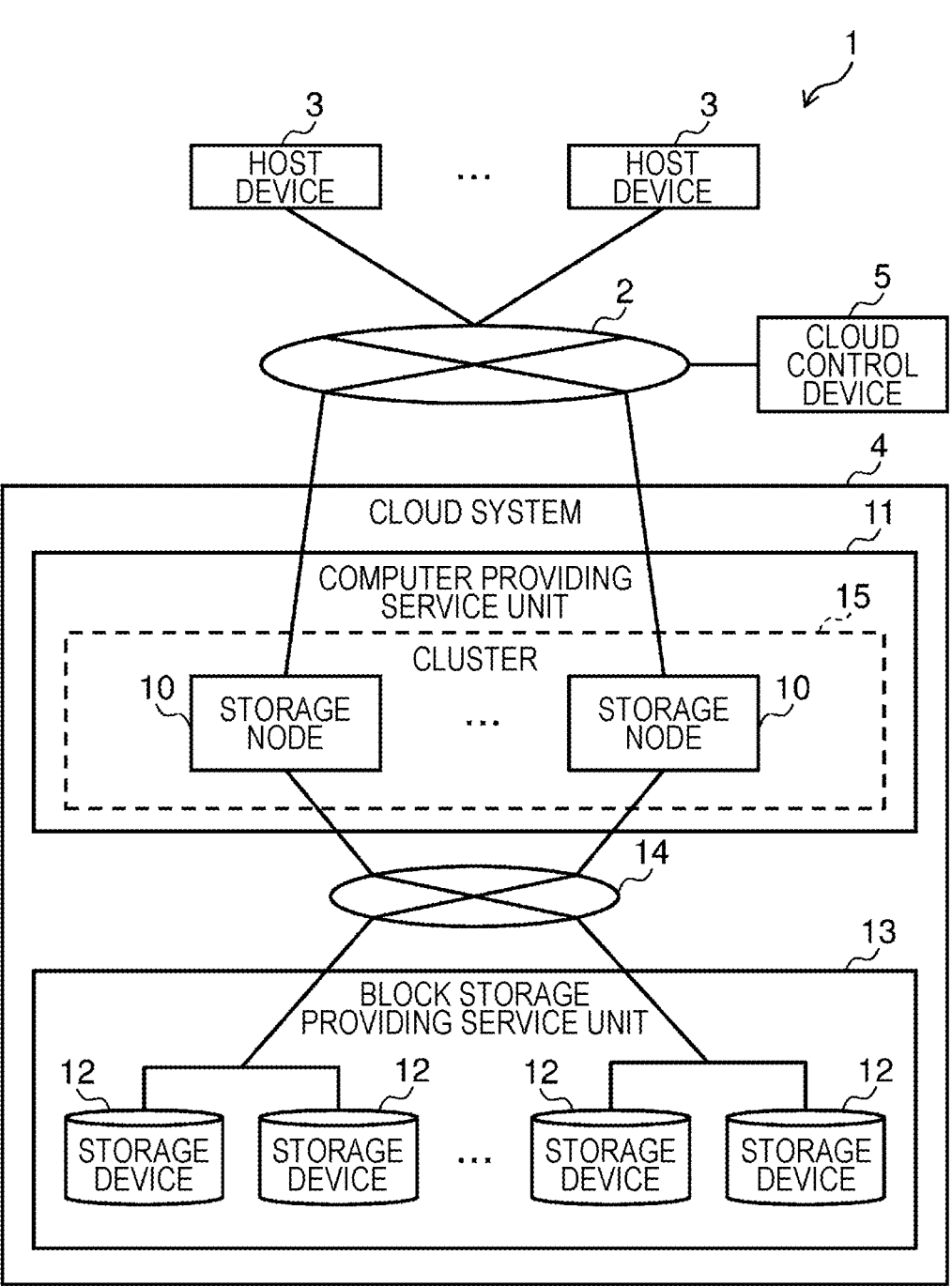
FIG. 1 is a diagram for describing an overall configuration of a storage system according to a first embodiment.

FIG. 1 is a diagram illustrating an overall configuration of a storage system 1 according to a first embodiment. The storage system 1 includes a plurality of host devices 3, a cloud system 4, and a cloud control device 5 connected to each other via a network 2 including, for example, Ethernet (registered trademark) or a local area network (LAN).

The host device 3 is a host device that transmits a read request and a write request (hereinafter referred to as "input/output (I/O) request") to the storage node 10 in the cloud system 4 in response to a user operation or a request from an application program. The host device 3 includes a general-purpose computer device. Note that the host device 3 may be a physical computer device or a virtual computer device such as a virtual machine. Further, the host device 3 may be incorporated in the cloud system 4.

The cloud system 4 includes a computer providing service unit 11 including a plurality of storage nodes 10 and a block storage providing service unit 13 including a plurality of storage devices 12 (storage media). In the cloud system 4, the storage nodes 10 constituting the computer providing service unit 11 and the storage devices 12 constituting the block storage providing service unit 13 are connected to each other via a block storage providing service network 14.

The storage node 10 is a physical or virtual server device that provides a storage area for reading and writing data to the host device 3. One or a plurality of storage devices 12 in the block storage providing service unit 13 is allocated to each storage node 10. The storage node 10 virtualizes a storage area provided by the allocated storage device 12 and provides the storage area to the host device 3.

Figure 2:
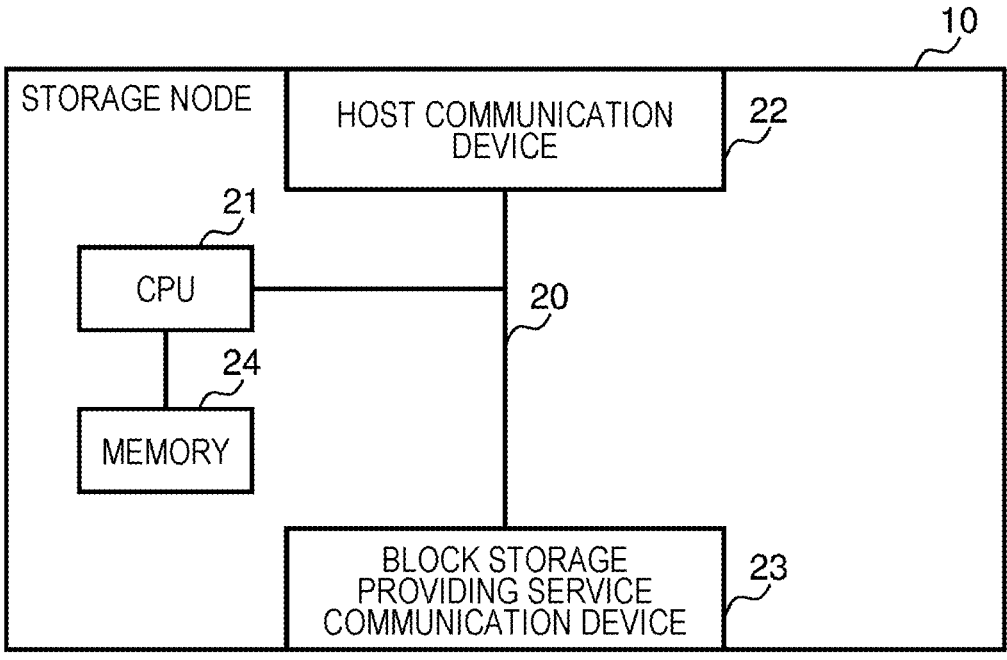
FIG. 2 is a diagram for describing a schematic configuration of a storage node according to the first embodiment.

FIG. 2 is a diagram illustrating a schematic configuration of the storage node 10 according to the first embodiment. As illustrated in FIG. 2, the storage node 10 includes a central processing unit (CPU) 21, a host communication device 22, a block storage providing service communication device 23, and a memory 24 connected to the CPU 21, which are mutually connected via an internal network 20. Each storage node 10 includes one or more CPUs 21, one or more host communication devices 22, one or more block storage providing service communication devices 23, and one or more memories 24.

In a case where the storage node 10 is a physical server device, each of the CPU 21, the host communication device 22, the block storage providing service communication device 23, and the memory 24 is configured by a physical device. In a case where the storage node 10 is a virtual server device, the CPU 21, the host communication device 22, the block storage providing service communication device 23, and the memory 24 are each configured as virtual devices.

The host communication device 22 is an interface for the storage node 10 to communicate with the host device 3, the cloud control device 5, or another storage node 10 via the network 2. The host communication device 22 includes, for example, a network interface card (NIC) or the like. In addition, the host communication device 22 performs protocol control when communicating with the host device 3, another storage node 10, or the cloud control device 5.

The block storage providing service communication device 23 is an interface for the storage node 10 to communicate with the storage device 12 in the block storage providing service unit 13 via the block storage providing service network 14. Specifically, the block storage providing service communication device 23 includes an NIC or the like, as in the host communication device 22. The block storage providing service communication device 23 performs protocol control when communicating with the storage device 12.

Note that the host communication device 22 and the block storage providing service communication device 23 may be physically different communication devices, or may be physically the same and logically separated communication devices. Furthermore, the host communication device 22 and the block storage providing service communication device 23 may be physically or logically the same communication device.

The description returns to FIG. 1. The storage device 12 includes one or more types of large-capacity non volatile storage devices such as a serial attached small computer system interface (SCSI) solid state drive (SSD), (SAS) a non volatile memory express (NVMe) SSD, a SAS hard disk drive, or a serial advanced technology attachment (ATA) (SATA) hard disk drive. The storage device 12 provides a physical or logical storage area for reading and writing data in response to an I/O request from the host device 3.

The cloud control device 5 is a general-purpose computer device having a function of a system administrator to control the computer providing service unit 11 and the block storage providing service unit 13 in the cloud system 4. The cloud control device 5 performs addition, deletion, a configuration change, or the like of the storage node 10 and a cluster 15 in the computer providing service unit 11 or the storage device 12 in the block storage providing service unit 13 via the network 2 according to an operation by the system administrator. Note that the cloud control device 5 may be a physical computer device or a virtual computer device such as a virtual machine. Further, the cloud control device 5 may be incorporated in the cloud system 4.
<Configuration Diagram of Memory 24 According to First Embodiment>

Figure 3:
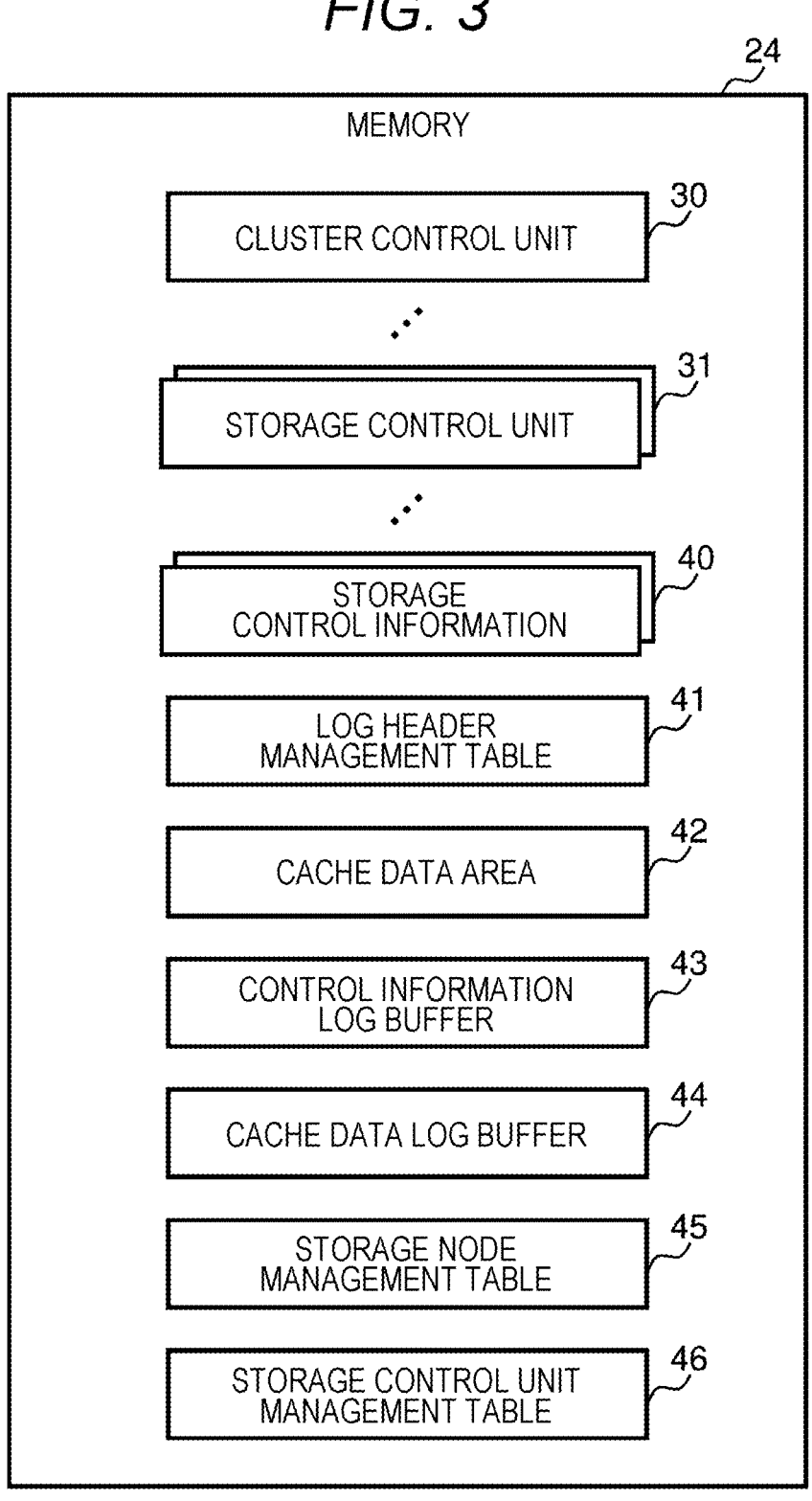
FIG. 3 is a diagram illustrating a configuration of a memory according to the first embodiment.

FIG. 3 is a diagram illustrating a configuration of the memory 24 according to the first embodiment. The memory 24 of each storage node 10 stores a cluster control unit 30, a storage control unit 31, storage control information 40, a log header management table 41, a cache data area 42, a control information log buffer 43, a cache data log buffer 44, a storage node management table 45, and a storage control unit management table 46.

The cluster control unit 30 and the storage control unit 31 are processing function units implemented by the CPU 21 executing a predetermined program.

The cluster control unit 30 manages and operates states of the storage nodes 10 constituting the cluster 15 and the storage devices 12 allocated to the storage nodes 10. The cluster control unit 30 manages the plurality of storage control units 31 in a redundancy group, and dispersedly arranges and manages the plurality of storage control units 31 belonging to the same redundancy group in a plurality of storage nodes 10.

In addition, the cluster control unit 30 manages and operates activation of the storage control unit 31 to be described later and an operation mode (an active mode or a standby mode to be described later) of the storage control unit 31. The cluster control unit 30 may be referred to as cluster control software or a cluster control program.

In addition, each cluster control unit 30 has a function of mutually monitoring the state, and in a case where a failure occurs in another storage node 10 for some reason such as a power interruption or a network interruption, detecting the failure and notifying the other cluster control unit 30 of the failure. Specific examples of the state of the "failure of the storage node" include a state in which a system disk necessary for operation of an operating system (OS) mounted on the storage node 10 has failed, a state in which a device itself constituting the storage node 10 has failed, and the like.

Figure 6:
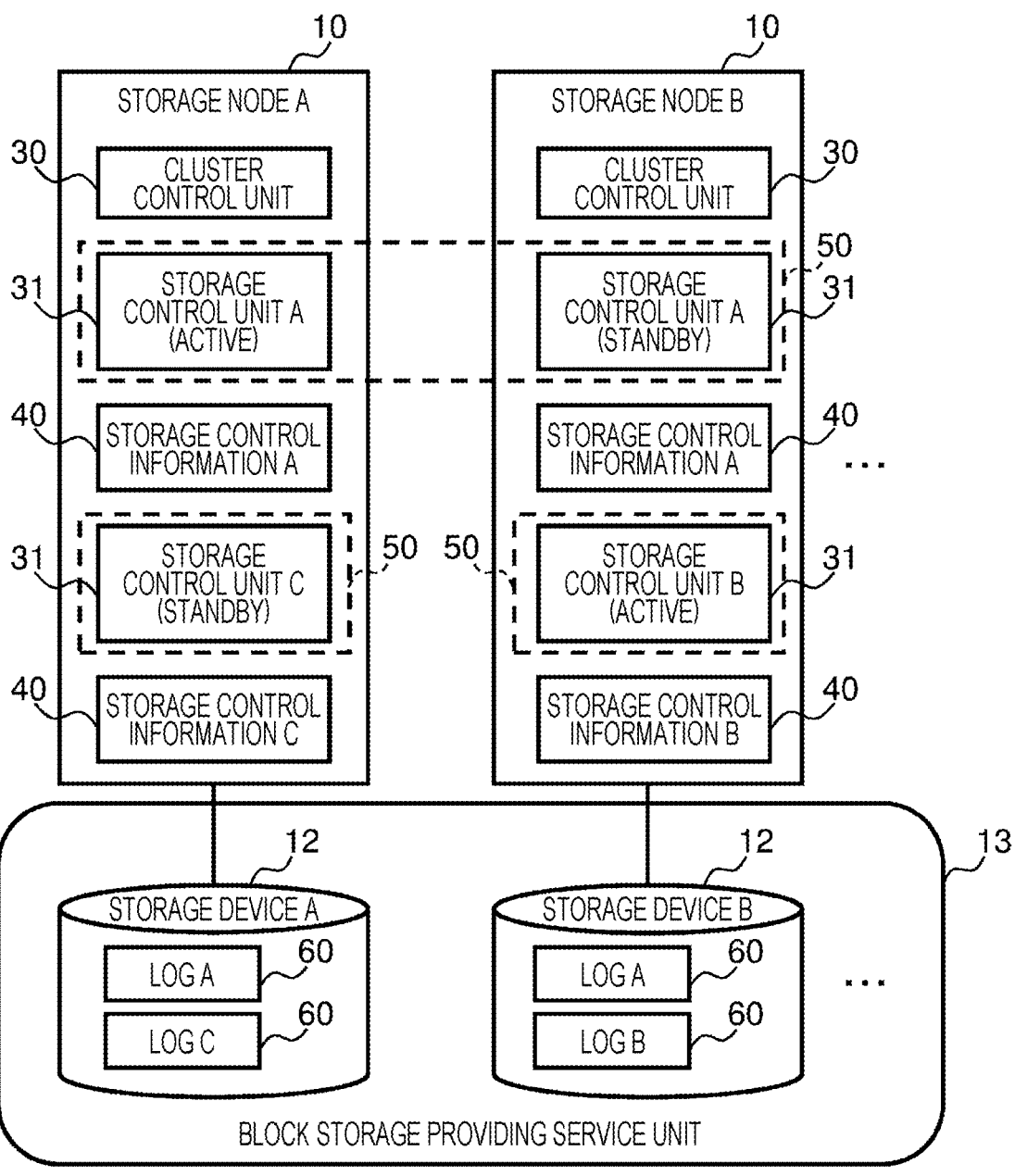
FIG. 6 is a diagram for describing a configuration in a normal state of the storage system according to the first embodiment.

Further, the cluster control unit 30 transfers the I/O request received from the host device 3 to the cluster control unit 30 of another corresponding storage node 10 via the block storage providing service network. In addition, the cluster control unit 30 passes the I/O request transferred from the cluster control unit 30 of another storage node 10 to the storage control unit 31 of a corresponding redundancy group 50 (FIG. 6). The redundancy group 50 will be described later with reference to FIG. 6.

The storage control unit 31 controls the storage system. The storage control unit 31 processes, for example, an I/O request received from the host device 3. The storage control unit 31 reads and writes data from and to a storage area provided by the plurality of storage devices 12 in response to a request from the host device 3. The storage control unit 31 may be referred to as storage control software or a storage control program.

The storage control information 40 is an area in which the storage control unit 31 stores control information for realizing various storage functions. The storage control information 40 includes a correspondence relationship between an address of cache data and a logical address in a volume in which the cached data is stored, cache control information including a state of the cache data (dirty data and clean data), and the like.

The log header management table 41 is a table that stores the log headers of the logs 60 of all the cache data on the storage device 12. The log 60 (FIG. 6) is information including update data itself and a log header, and indicating how the control information and the cache data on the memory 24 have been updated. The log header includes information indicating an update position and an update size of data and an order relation between updates.

The cache data area 42 is an area for storing cache data.

The control information log buffer 43 temporarily holds a log of the storage control information.

The cache data log buffer 44 temporarily holds a log of cache data.

The storage node management table 45 is data for managing the state of each storage node 10 constituting the cluster 15. The storage node management table 45 will be described later with reference to FIG. 4.

The storage control unit management table 46 is data for managing the state of the storage control unit 31 belonging to each storage node 10 constituting the cluster 15. The storage control unit management table 46 will be described later with reference to FIG. 5.
<Storage Node Management Table 45 According to First Embodiment>

FIG. 4 is a diagram illustrating the storage node management table 45 according to the first embodiment. The CPU 21 forms and manages the storage node management table 45. Each entry of the storage node management table 45 manages a state of each storage node 10 belonging to the cluster 15.

Each column of the storage node management table 45 will be described below. The column 451 records an ID indicating the storage node 10. The column 452 records the state of the corresponding storage node 10. As the value of the state of the storage node 10, for example, "normal" is set when the storage node 10 is operating normally, and "abnormal" is set when a failure occurs in the storage node 10.

The column 453 records failure occurrence date and time when a failure occurs in the corresponding storage node 10. When a failure occurs in the plurality of storage nodes 10, the order of occurrence of the storage node failure can be obtained from the date and time of occurrence of the failure. When no failure occurs in the storage node 10, an invalid value such as "-" may be recorded.

<Storage Control Unit Management Table 46 According to First Embodiment>

FIG. 5 is a diagram illustrating the storage control unit management table 46 according to the first embodiment. The cluster control unit 30 (FIG. 3) creates the storage control unit management table 46 and manages the redundancy group of the storage control unit 31 based on the storage control unit management table 46. Each entry of the storage control unit management table 46 manages a state of the storage control unit 31 operating in each storage node 10 belonging to the cluster 15.

Hereinafter, each column of the storage control unit management table 46 will be described. The column 461 records an ID indicating the storage control unit 31. The column 462 records the state of the corresponding storage control unit 31. The value of the state of the storage control unit 31 is set to "normal (active)" or simply "active", for example, in a case where the storage control unit 31 is operating normally and is in a state of receiving an I/O request from the host device 3 (state of the working system, hereinafter referred to as "active mode"). In addition, when the storage control unit 31 operates normally and does not accept an I/O request from the host device 3 (State of a standby system, hereinafter referred to as a "standby mode"), "normal (standby)" or simply "standby" is set. On the other hand, in a case where the storage control unit 31 is not in operation, "abnormal" is set.

The column 463 records an ID indicating the redundancy group 50 to which the corresponding storage control unit 31 belongs. The column 464 records an ID indicating the storage node 10 in which the corresponding storage control unit 31 operates.

<Configuration of Storage System 1 According to First Embodiment at Normal Time>

FIG. 6 is a diagram for describing a configuration of the storage system 1 at a normal time. In the present embodiment, as illustrated in FIG. 6, the storage control unit 31 mounted in each storage node 10 configures a group for redundancy (hereinafter referred to as a "redundancy group 50") together with one or a plurality of storage control units 31 mounted in another storage node 10.

Note that FIG. 6 illustrates an example in which two storage control units 31 constitute the redundancy group 50. Also in the following description, it is assumed that two storage control units 31 constitute the redundancy group 50. The number of storage control units 31 constituting the redundancy group 50 is not limited to two, and may be three or more.

In the redundancy group 50, at least one storage control unit 31 is set to the active mode. In addition, the remaining storage control units 31 that are not set to the active mode are set to the standby mode.

Therefore, in the redundancy group 50 including the two storage control units 31, any of a configuration in which both of the two storage control units 31 are set to the active mode (hereinafter referred to as "active-active configuration") and a configuration in which one storage control unit 31 is set to the active mode and the other storage control unit 31 is set to the standby mode (hereinafter referred to as "active-standby configuration") is used.

Then, in the redundancy group 50 adopting the active-standby configuration, in a case where a failure occurs in the storage control unit 31 set to the active mode or the storage node 10 in which the storage control unit 31 operates, or in a case where such a storage node 10 is removed, the storage control unit 31 that has been set to the standby mode can be changed to the active mode. As a result, the storage control unit 31 that has been set to the standby mode takes over the processing of the I/O request from the host device 3. This function is referred to as a "failover function".

In order to realize such a failover function, the storage control units 31 belonging to the same redundancy group 50 always hold the same storage control information 40. In order to realize this, when the storage control information 40 is updated, the storage control unit 31 set to the active mode transmits a difference between the storage control information before and after the update as difference data to another storage control unit 31 belonging to the same redundancy group 50 as itself. Based on the difference data, the other storage control unit 31 updates the storage control information 40 held by the storage control unit 31. As a result, the storage control information 40 held by each of the storage control units 31 constituting the same redundancy group 50 is always maintained in a synchronized state.

In this manner, the two storage control units 31 constituting the redundancy group 50 always hold the storage control information 40 having the same content. As a result, even in a case where a failure occurs in the storage control unit 31 set to the active mode or the storage node 10 in which the storage control unit 31 operates, or in a case where such a storage node is removed, the other storage control unit 31 belonging to the same redundancy group 50 as the storage control unit 31 can immediately take over the processing executed by the storage control unit 31 so far.

As a means for realizing such processing, the cluster control unit 30 of each storage node 10 shares information indicating which storage node 10 each of the storage control units 31 existing in the cluster 15 is disposed in, which redundancy group 50 the each storage control unit belongs to, and which of the active mode and the standby mode the operation mode is set to. The information is managed by the storage node management table 45 and the storage control unit management table 46.

In the example illustrated in FIG. 6, the storage control unit 31 (storage control unit A) of the storage node 10 (storage node A) and the storage control unit 31 (storage control unit A) of the storage node 10 (storage node B) belong to the same redundancy group 50.

The storage control unit 31 (storage control unit A) of the storage node 10 (storage node A) holds the storage control information 40 (storage control information A) in the storage node 10 (storage node A), and the storage control unit 31 (storage control unit A) of the storage node 10 (storage node A) writes the log 60 (log A) to the storage device 12 (storage device A).

Similarly, the storage control unit 31 (storage control unit A) of the storage node 10 (storage node B) holds the storage control information 40 (storage control information A) in the storage node 10 (storage node B), and writes the log 60 (log A) to the storage device 12 (storage device B).

In addition, the storage control unit 31 (storage control unit C) of the storage node 10 (storage node A) belongs to the same redundancy group 50 as the storage control unit 31 of the storage node 10 (not illustrated). The storage control unit 31 (storage control unit C) of the storage node 10 (storage node A) holds the storage control information 40 (storage control information C) in the storage node 10 (storage node A), and writes the log 60 (log C) to the storage device 12 (storage device A).

Similarly, the storage control unit 31 (storage control unit B) of the storage node 10 (storage node B) belongs to the same redundancy group 50 as the storage control unit 31 of the storage node 10 (not illustrated). The storage control unit 31 (storage control unit B) of the storage node 10 (storage node B) holds the storage control information 40 (storage control information B) in the storage node 10 (storage node B), and writes the log 60 (log B) to the storage device 12 (storage device B).

<Outline of System Recovery Process According to First Embodiment>

Figure 7:
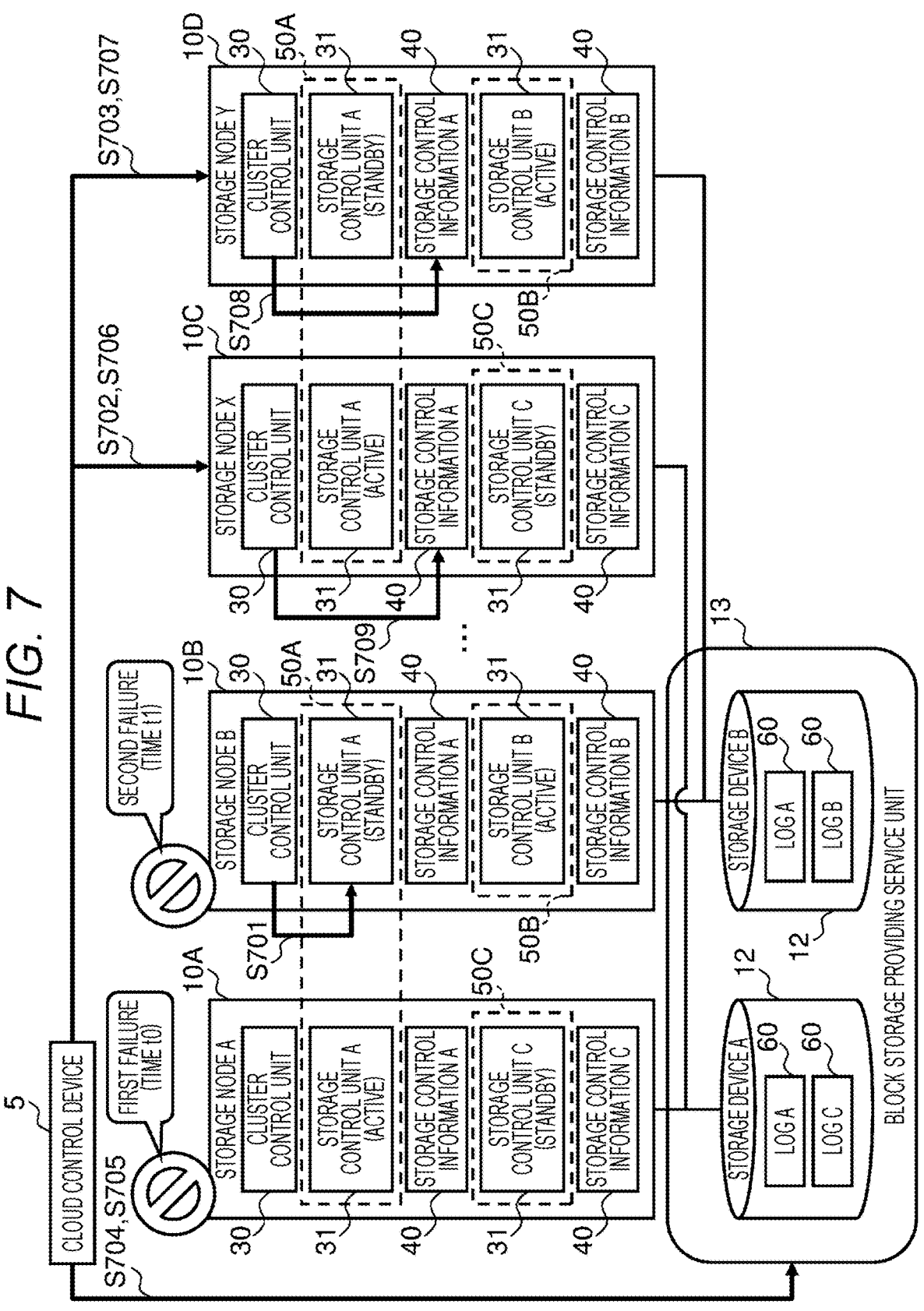
FIG. 7 is a diagram for describing an outline of a system recovery process according to the first embodiment.

Next, a flow of a series of processing when all the storage control units 31 belonging to the same redundancy group 50 are stopped due to a failure occurring in the plurality of storage nodes 10 will be described. FIG. 7 is a diagram for describing an outline of the system recovery process according to the first embodiment.

A flow in a case where a failure occurs in the "storage node A" at time=t0 and then a failure occurs in the "storage node B" at time=t1 (t1≥t0) (hereinafter referred to as a "system recovery process") will be described with reference to FIG. 7.

First, the cluster control unit 30 of any storage node 10 connected to the cluster control unit 30 of the "storage node A" detects that a failure has occurred in the "storage node A". Then, the cluster control unit 30 that has detected the failure transmits a notification indicating that the failure of the "storage node A" has been detected to another storage node 10. Then, the cluster control unit 30 of the other storage node 10 recognizing the failure of the "storage node A" switches the operation mode of the storage control unit 31 in the other storage node belonging to the same redundancy group 50 as the storage control unit 31 in the "storage node A" from the standby mode to the active mode. In the case of the example of FIG. 7, the cluster control unit 30 of the "storage node B" changes the state of the "storage control unit A (standby)" to the active mode (step S701). As a result, the I/O processing executed by the "storage control unit A (active)" so far is taken over to the "storage control unit A (standby)" (failover).

In addition, the cluster control unit 30 of the other storage node 10 recognizing the failure of the "storage node A" instructs the "storage control unit A (standby)" or the "storage control unit C (active)" in the other storage node belonging to the same redundancy group 50 as the "storage control unit A (active)" and the "storage control unit C (standby)" in the "storage node A" in which the failure has occurred not to transfer the difference data to the "storage control unit A (active)" and the "storage control unit C (standby)" belonging to the same redundancy group 50 after the time t1 even when the storage control information 40 held by the storage control unit 31 is updated.

Subsequently, the cluster control unit 30 of any of the storage nodes 10 connected to the cluster control unit 30 of the "storage node B" detects that a failure has occurred in the "storage node B". Then, the cluster control unit 30 that has detected the failure transmits a notification indicating that the failure of the "storage node B" has been detected to another storage node 10. Then, the cluster control unit 30 of the other storage node 10 recognizing the failure of the "storage node B" switches the operation mode of the storage control unit 31 in the other storage node belonging to the same redundancy group 50B as the storage control unit 31 in the "storage node B" from the standby mode to the active mode. At this time, the cluster control unit 30 detects that all other storage control units 31 belonging to the same redundancy group 50A as the "storage control unit A" are stopped due to a failure. Then, the cluster control unit 30 (hereinafter referred to as a "failure handling cluster control unit") of another storage node 10 that has recognized the failure of the "storage node B" transmits a request for creating an alternative storage node to the cloud control device 5 in order to create a storage node 10 (hereinafter referred to as an "alternative storage node") that is an alternative to the "storage node A" and the "storage node B" in the failed state.

When receiving the request for creating the alternative storage node, the cloud control device 5 creates new storage nodes 10 ("storage node X" and "storage node Y" in FIG. 7) in the cluster 15 (Steps S702 and S703).

Specifically, in a case where the storage node 10 is a physical storage apparatus, the cloud control device 5 incorporates an existing physical storage apparatus into the cluster 15, and in a case where the storage node 10 is a virtual storage apparatus, the cloud control device 5 generates a new virtual storage apparatus and incorporates the virtual storage apparatus into the cluster 15.

In addition, the failure handling cluster control unit requests the cloud control device 5 to detach all the storage devices 12 allocated to the "storage node A" and the "storage node B" in which the failure occurs. The cloud control device 5 that has received the request detaches all the storage devices 12 allocated to the "storage node A" and the "storage node B" (step S704).

Further, the failure handling cluster control unit requests the cloud control device 5 to attach all the storage devices 12 detached from the "storage node A" to the "storage node X" newly created in step S704. Similarly, the failure handling cluster control unit requests the cloud control device 5 to attach all the storage devices 12 detached from the "storage node B" to the newly created "storage node Y" similarly.

The cloud control device 5 that has received this request attaches all the storage devices 12 allocated to the "storage node A" and the "storage node B" to the "storage node X" and the "storage node Y", respectively (step S705).

On the other hand, when the "storage node X" and the "storage node Y" are added in the cluster 15 as described above, the cluster control unit 30 in the "storage node X" and the "storage node Y" is activated by the cloud control device 5 (Steps S706 and S707).

Then, the activated cluster control unit 30 of each of the "storage node X" and "storage node Y" starts to share the configuration information (the storage node management table 45 and the storage control unit management table 46) of each storage node 10 including the storage node in the cluster 15 with the cluster control unit 30 of another storage node 10.

As a result, when a failure occurs in all the storage control units 31 constituting the redundancy group 50A to which the storage control unit A belongs (that is, the memory content is lost), the cluster control units 30 (hereinafter referred to as "alternative cluster control units") of the "storage node X" and the "storage node Y" perform processing of restoring the memory content of the storage control units A of the "storage node X" and the "storage node Y" from the log ("memory data recovery by log" to be described later) (Steps S708 and S709).

Specifically, the alternative cluster control unit refers to the storage node management table 45 and the storage control unit management table 46 in its own storage node, and identifies the storage node 10 to which each storage control unit 31 constituting the redundancy group 50A belongs ("storage node A" and "storage node B" in the example of FIG. 7).

Then, the alternative cluster control unit identifies the storage node 10 in which the failure occurs last among these storage nodes 10 as the storage node 10 associated with the log 60 (hereinafter referred to as a "valid log") reflecting the latest memory update ("storage node B" in the example of FIG. 7). Thereafter, the alternative cluster control unit restores the memory content using the log of the storage device 12 ("storage device B" in the example of FIG. 7) associated with the storage node B identified in this way (log recovery process). Details of the log recovery process will be described later with reference to FIG. 13.

In addition, since any of the storage control units 31 constituting the redundancy group 50B to which the storage control unit B belongs operates normally, the cluster control unit 30 (alternative cluster control unit) of the "storage node Y" performs a process of restoring the memory content of the storage control unit B from the redundancy group 50B of the storage control unit B ("memory data recovery from a redundant system" to be described later) (not illustrated in the example of FIG. 7). Similarly, the storage control unit C of the "storage node X" performs a process of restoring the memory content from the redundancy group 50C to which the storage control unit C belongs ("memory data recovery from a redundant system" to be described later).

As described above, the lost memory content can be restored to the memories 24 of the "storage node X" and the "storage node Y". Thereafter, the cluster control unit 30 of each of the "storage node X" and the "storage node Y" activates the storage control unit 31 in their own storage node. Specifically, for example, the "storage node X" activates the "storage control unit A" in the active mode and activates the "storage control unit C" in the standby mode. In addition, the "storage node Y" activates the "storage control unit A" in the standby mode and activates the "storage control unit B" in the active mode.

Thereafter, the alternative cluster control unit updates the state of each storage node 10 in the storage node management table 45, and updates the state of each storage control unit 31 in the storage control unit management table 46.

Through the above processing, the newly created "storage node X" and "storage node Y" become available as part of the cluster 15.

<Control Information Update Process According to First Embodiment>

Figure 8:
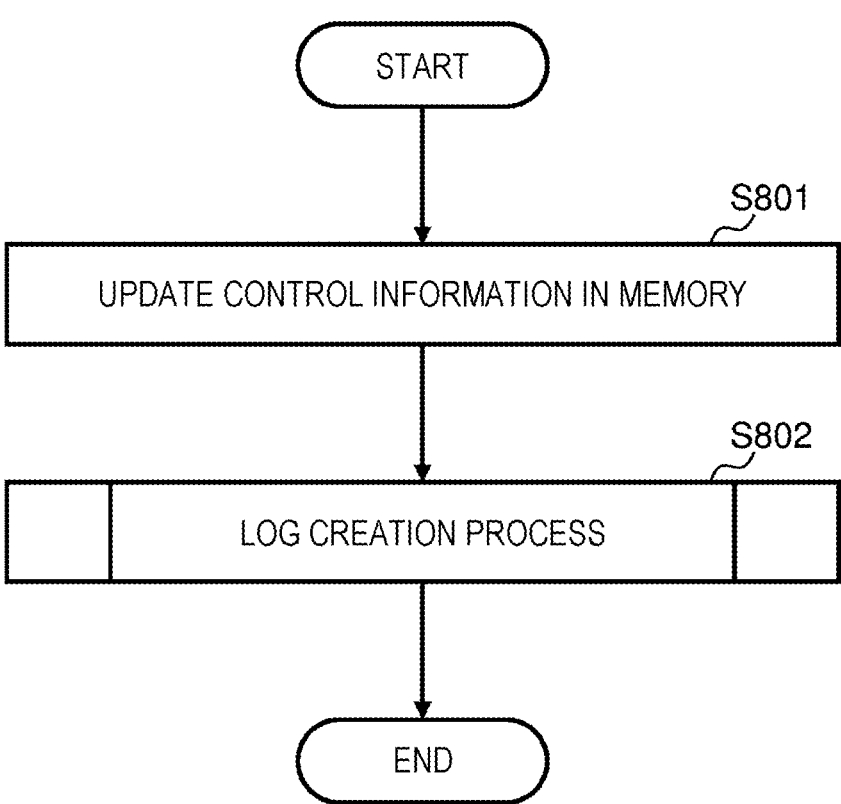
FIG. 8 is a flowchart of a control information update process according to the first embodiment.

FIG. 8 is a flowchart of a control information update process according to the first embodiment. The control information update process is executed when the update of the storage control information 40 is requested.

First, in step S801, the storage control unit 31 updates the storage control information 40 in the memory 24. Next, in step S802, the storage control unit 31 performs a log creation process. Details of the log creation process will be described later with reference to FIG. 10.

<Cache Data Update Process According to First Embodiment>

Figure 9:
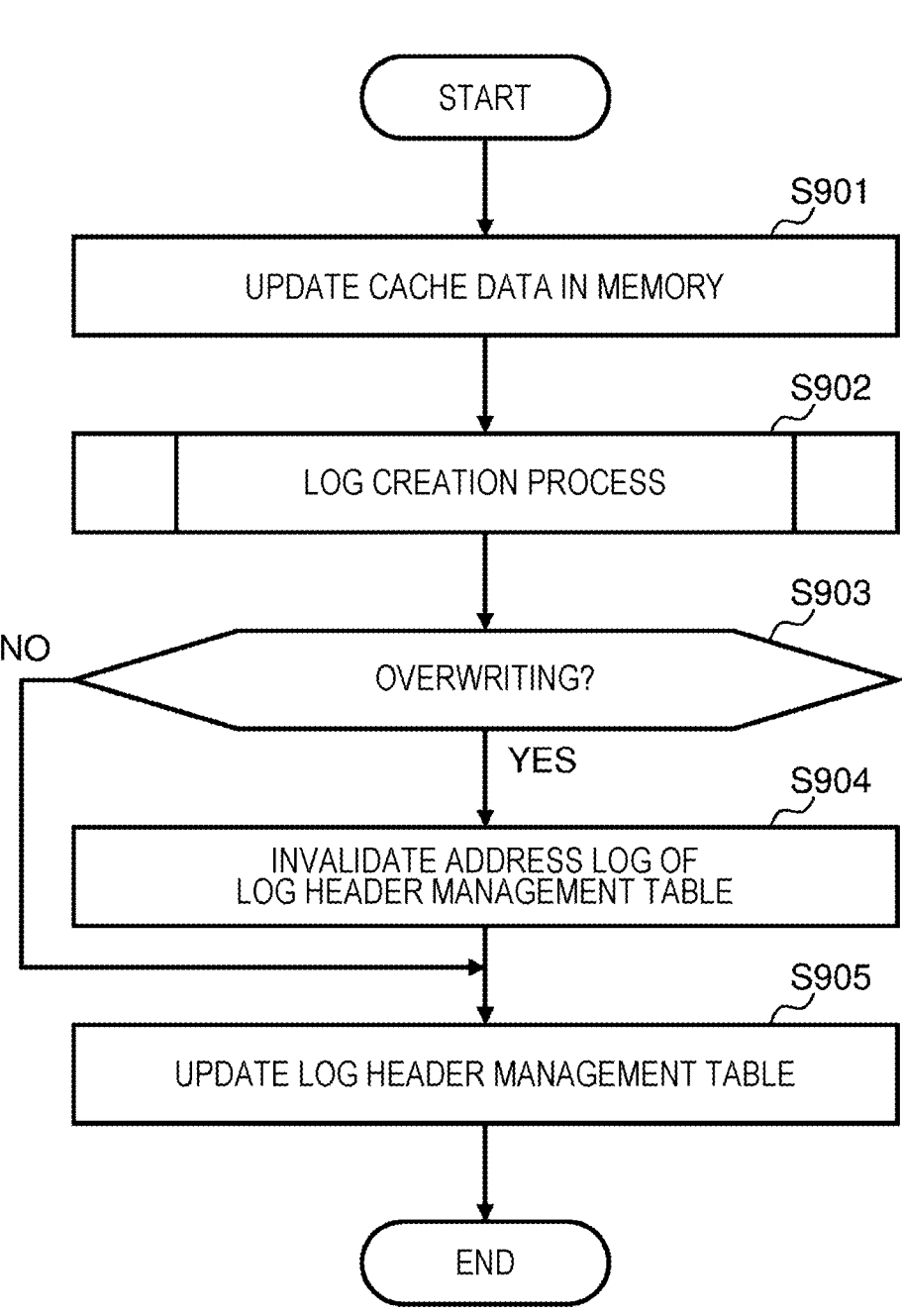
FIG. 9 is a flowchart of a cache data update process according to the first embodiment.

FIG. 9 is a flowchart of a cache data update process according to the first embodiment. The cache data update process is executed in response to generation of data to be stored in the cache data area 42 or update of data stored in the cache data area 42.

First, in step S901, the storage control unit 31 updates the cache data in the memory. Specifically, for example, data received from the host device 3 is written in the cache data area 42 allocated in the memory 24.

Next, in step S902, the storage control unit 31 performs a log creation process. The log creation process is a process of creating the log 60 related to the updated cache data, and will be described later with reference to FIG. 10.

Next, in step S903, the storage control unit 31 determines whether the cache data update in step S901 is overwriting. That is, the storage control unit 31 checks whether the log 60 (hereinafter referred to as an "address log") related to the cache data update of the address range included in the range of the cache data area 42 updated this time exists in the existing log 60, and determines that the update is overwriting is performed when the log exists. The storage control unit 31 advances the process to step S904 in the case of overwriting (Yes in step S903), and advances the process to step S905 in the case of new writing (No in step S903).

In step S904, the storage control unit 31 invalidates the address log written in the log header management table 41. In step S905, the storage control unit 31 updates the log header management table 41.

<Log Creation Process According to First Embodiment>

Figure 10:
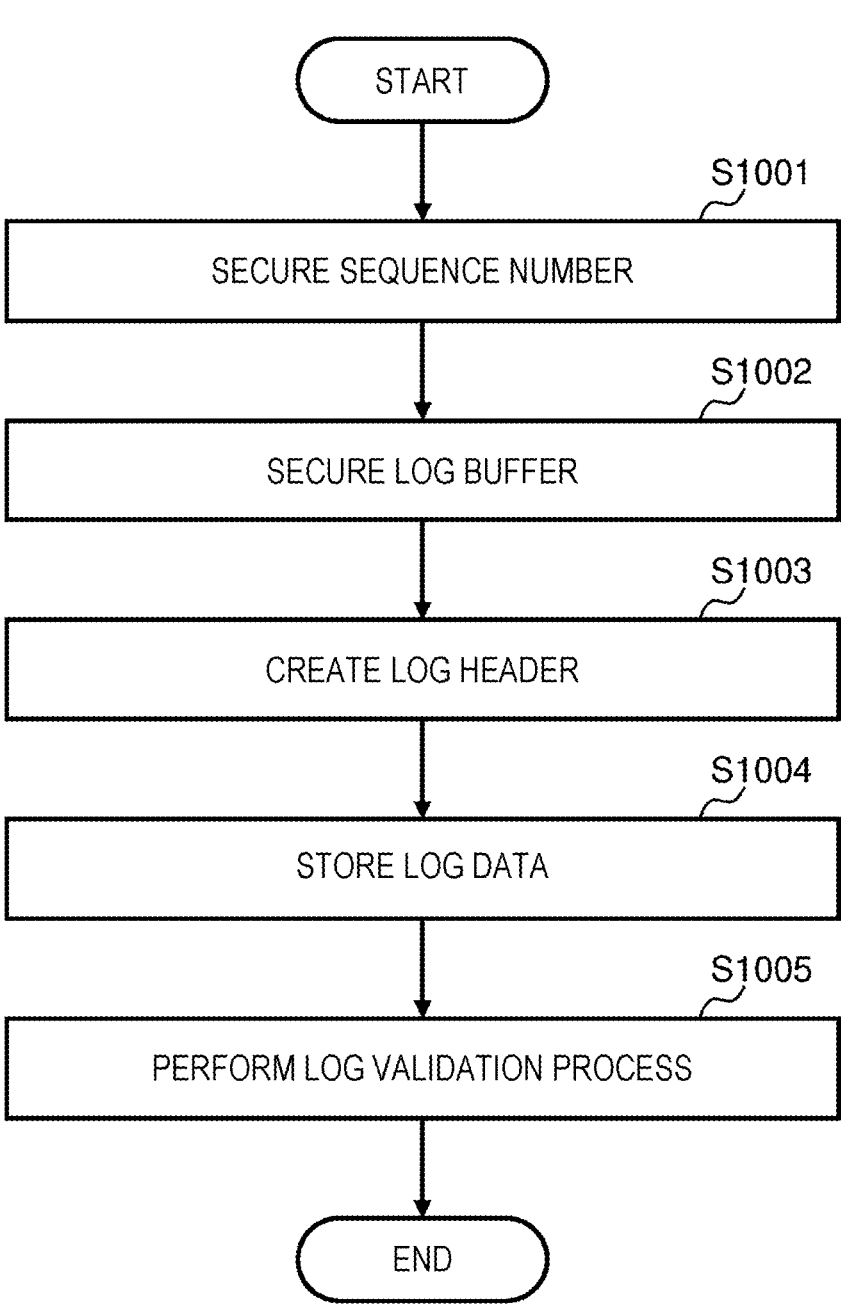
FIG. 10 is a flowchart of a log creation process according to first embodiment.

FIG. 10 is a flowchart of a log creation process according to the first embodiment.

First, in step S1001, the storage control unit 31 newly secures a sequence number. The sequence number is a number indicating the order of creation of the log 60, and a value is added by one each time a new log 60 is created.

Next, in step S1002, the storage control unit 31 secures a log buffer for temporarily storing the log 60. Specifically, the storage control unit 31 allocates an area having a size necessary for storing the log 60 to be created from the control information log buffer 43 in a case where the data to be stored in the log 60 is the control information, and from the cache data log buffer 44 in a case where the data is the cache data.

Next, in step S1003, the storage control unit 31 creates a log header. The log header includes a sequence number, an address of the target data on the memory 24, a size of the target data, and the like.

Next, in step S1004, the storage control unit 31 stores the log data in the log buffers of the control information log buffer 43 and the cache data log buffer 44. Next, in step S1005, the storage control unit 31 performs a validation process of the created log 60. Specifically, for example, a flag indicating validity/invalidity of the log 60 is included in the log header, and the log 60 is validated by turning on the flag.

<Log Saving Process According to First Embodiment>

Figure 11:
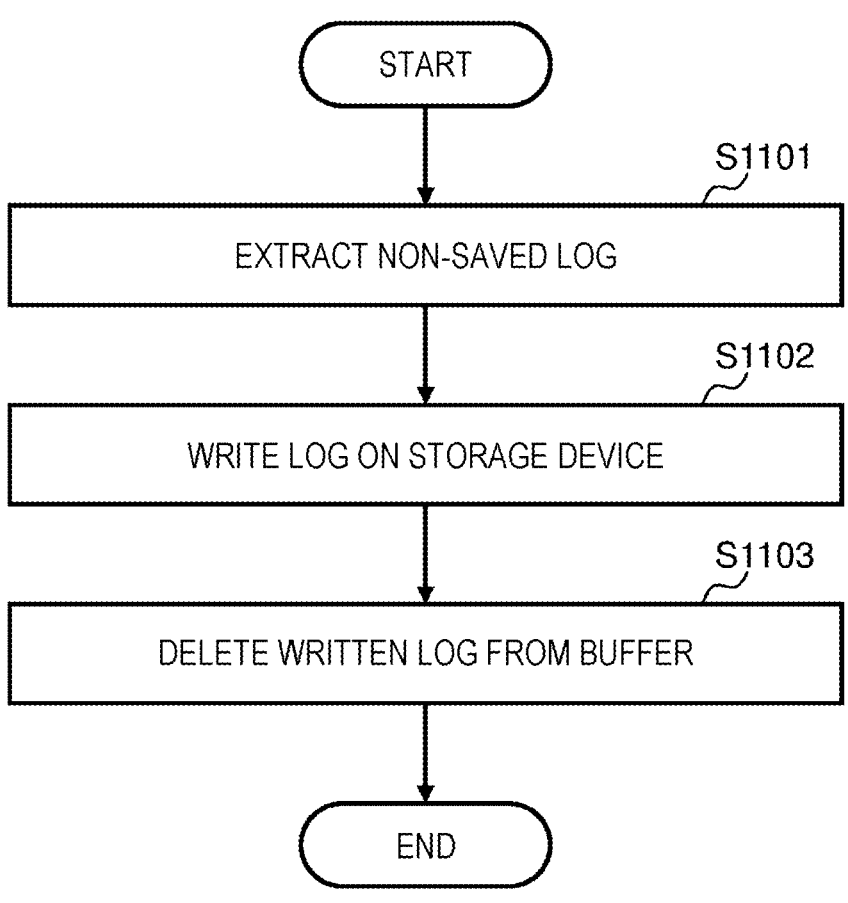
FIG. 11 is a flowchart of a log saving process according to the first embodiment.

FIG. 11 is a flowchart of the log saving process according to the first embodiment. The log saving process is a process of writing the log 60 accumulated in the log buffers of the control information log buffer 43 and the cache data log buffer 44 to the storage device 12, and is executed when the log 60 is required to be written to the storage device 12, for example, before host response in the process of a write request from the host device 3.

First, in step S1101, the storage control unit 31 extracts the non-saved log, that is, the log 60 that has not yet been written in the storage device 12, from the log buffer of the memory 24.

Next, in step S1102, the storage control unit 31 writes the log 60 acquired in step S1101 in the storage device 12. Next, in step S1103, the storage control unit 31 deletes the log 60 written in the storage device 12 in step S1102 from the log buffer.

<Base Image Saving Process According to First Embodiment>

Figure 12:
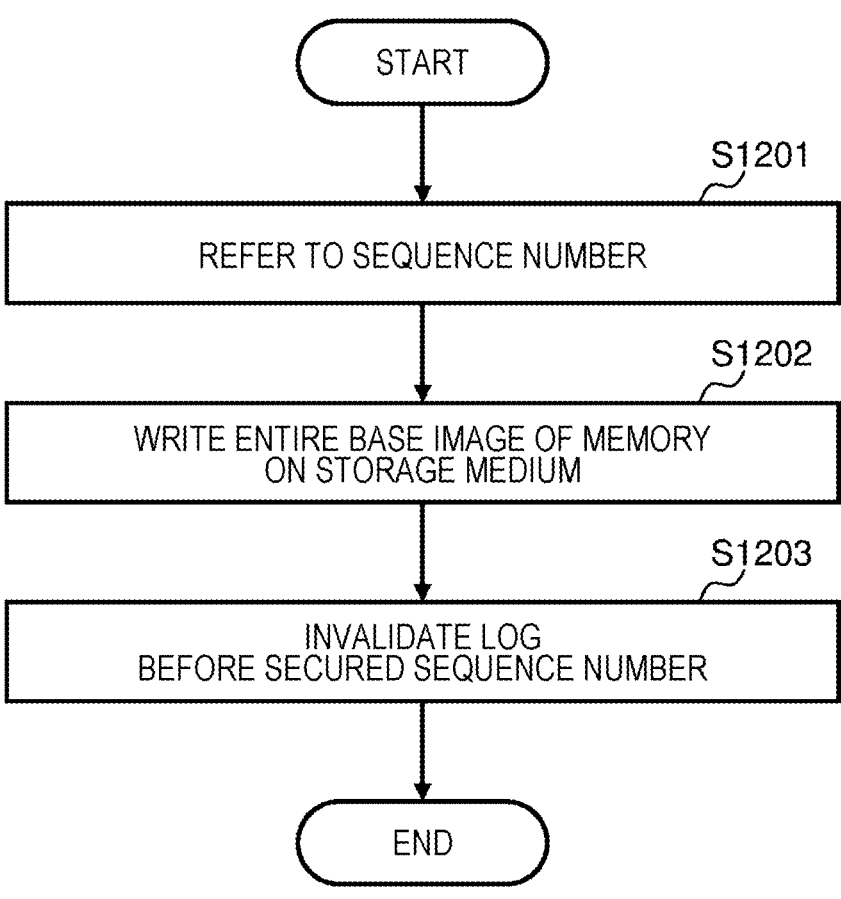
FIG. 12 is a flowchart of a base image saving process according to first embodiment.

FIG. 12 is a flowchart of a base image saving process according to the first embodiment. The base image process is a process of writing the entire memory area (base image) to be protected in the storage device 12, and is used to protect the control information in the present embodiment, and is executed at a predetermined timing, for example, when a certain amount or more of the control information log on the storage device 12 is accumulated.

First, in step S1201, the storage control unit 31 refers to the sequence number and acquires the latest sequence number at the present time.

Next, in step S1202, the storage control unit 31 writes the entire base image of the memory 24 into the storage device 12. An area of the storage device 12 in which the base image is written is referred to as a base image area. When this process is completed, the old log 60 is unnecessary.

Next, in step S1203, the storage control unit 31 invalidates all the logs 60 before the sequence number acquired in step S1201.

<Log Recovery Process According to First Embodiment>

Figure 13:
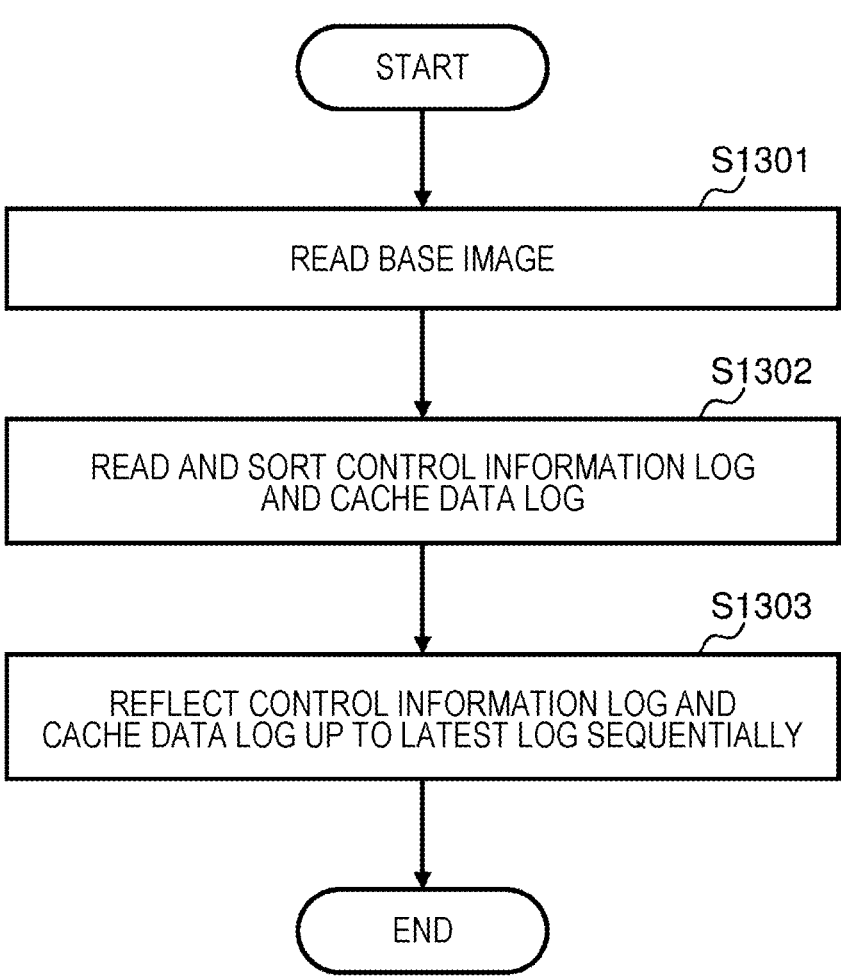
FIG. 13 is a flowchart of a log recovery process according to the first embodiment.

FIG. 13 is a flowchart of a log recovery process according to the first embodiment. The log recovery process is a process of recovering the control information and the dirty data in the memory 24 from the log 60 stored in advance in the storage device 12 when the information in the memory 24 is lost due to a factor such as a storage node failure. The log recovery process is executed by the CPU 21 of the restoration destination storage node 10 before resuming the acceptance of the I/O.

First, in step S1301, the storage control unit 31 reads the base image from the base image area on the storage device 12 and stores the read base image in the storage control information 40 on the memory 24.

Next, in step S1302, the storage control unit 31 reads the log 60 of the control information and the log 60 of the cache data from the storage device 12, and sorts the logs in chronological order according to the sequence number. Next, in step S1303, the storage control unit 31 reflects the logs 60 sorted in step S1302 in the respective areas of the control information log buffer 43 and the cache data log buffer 44 on the memory 24 according to the address information written in the header of the log 60 in the sort order.

<System Recovery Process According to First Embodiment>

FIG. 14 is a flowchart of a system recovery process according to the first embodiment.

When a failure occurs in the storage node 10 in the cluster 15 (hereinafter, the storage node 10 in which a failure has occurred is referred to as a "failure storage node"), the system recovery process is a process of recovering the system by preparing a storage node 10 (hereinafter, referred to as an "alternative storage node") as an alternative to the failure storage node, and restoring data existing in the memory 24 of the failure storage node in the memory of the alternative storage node.

The system recovery process is started when the cluster control unit 30 (hereinafter referred to as a "failure detection cluster control unit") of any storage node 10 in the cluster 15 detects a failure of another storage node (failure storage node).

First, in step S1401, the failure detection cluster control unit requests the cloud control device 5 to create an alternative storage node that substitutes for the failure storage node.

Next, in step S1402, the failure detection cluster control unit selects a memory data recovery means. In step S1402, the failure detection cluster control unit identifies the storage control unit belonging to the failure storage node, and identifies each redundancy group (hereinafter, referred to as a "failure-occurring redundancy group") to which each storage control unit belongs. Then, for each failure-occurring redundancy group, the failure detection cluster control unit determines whether a failure occurs in all the storage control units 31 belonging to the failure-occurring redundancy group. The failure detection cluster control unit selects "memory data recovery by log" (first recovery method) for the failure-occurring redundancy group in which it is determined that the failure occurs in all the storage control units 31 belonging to the failure-occurring redundancy group. On the other hand, the failure detection cluster control unit selects "memory data recovery from the redundant system" (second recovery method) for the failure-occurring redundancy group in which it is determined that the storage control unit 31 in the normal state exists among the storage control units 31 belonging to the failure-occurring redundancy group.

The "memory data recovery by log" is a method of recovering memory data by using the log 60 written by the failure storage node to the storage device 12. The "memory data recovery from the redundant system" is a method of restoring the memory data by replicating the redundant memory data in the storage control unit 31 in the normal state belonging to the same redundancy group 50 as the failure storage node.

In general, the data access speed to the storage device 12 is often lower than the memory data copy speed between the storage nodes 10. For example, in a case where a failure has occurred in all the storage control units 31 belonging to the same redundancy group 50 as the failure storage node, memory data recovery using a log is selected. On the other hand, when there is a storage control unit 31 in which no failure has occurred among the storage control units 31 belonging to the same redundancy group 50 as the failure storage node, memory data recovery from the redundant system is selected. In this manner, the time required for the system recovery process can be shortened by using the available memory data.

When the "memory data recovery by log" is selected in step S1402 (step S1403 Yes), the failure detection cluster control unit advances the process to step S1404. On the other hand, when the "memory data recovery from the redundant system" is selected in step S1402 (step S1403 No), the failure detection cluster control unit advances the process to step S1409. When proceeding to step S1409, the failure detection cluster control unit requests the cloud control device 5 to allocate the storage device 12 to the alternative storage node.

In step S1404, the failure detection cluster control unit selects one storage device 12 (hereinafter referred to as a "selected storage device") allocated to the failure storage node, and requests the cloud control device 5 to perform a detach process for detaching the selected storage device from the failure storage node.

Next, in step S1405, the failure detection cluster control unit requests the cloud control device 5 to perform an attach process of attaching the storage device 12 to the alternative storage node.

Next, in step S1406, the failure detection cluster control unit determines whether the processing in steps S1404 and S1405 has been completed for all the storage devices 12 allocated to the failure storage node. When the processing has been completed for all the storage devices 12 (step S1406 Yes), the failure detection cluster control unit advances the process to step S1407. On the other hand, when the processing has not been completed for all the storage devices 12 (step S1406 No), the failure detection cluster control unit returns the process to step S1404. In step S1404 in which the processing is returned from step S1406, the failure detection cluster control unit repeats the processing in steps S1404 to S1406 until the determination result in step S1406 is Yes while sequentially switching the storage device 12 selected in step S1404.

In step S1407, in order to restore the memory content lost in the failure storage node, the cluster control unit 30 (hereinafter referred to as an "alternative cluster control unit") of the alternative storage node designates the redundancy group 50 to which the failure storage node belongs, and executes the valid log selection process to select the storage node 10 (specific storage node) having the valid log. Details of the valid log selection process will be described later with reference to FIG. 15.

Next, in step S1408, the alternative cluster control unit executes a log recovery process (FIG. 13) (first recovery process) to restore the storage content stored in the memory from the log in the storage device 12 associated with the storage node 10 having the "valid log" selected in step S1407.

In step S1409 (the process transferred from step S1403 NO), since the second recovery method is selected by the failure detection cluster control unit, instead of the first recovery method, the alternative cluster control unit restores the storage content in the memory 24 included in the alternative storage node based on the storage content stored in the memory 24 of the storage node 10 including the normally operating storage control unit 31 belonging to the same redundancy group as the storage control unit 31 in which a failure has occurred (referred to as a "failure storage control unit").

Next, in step S1410, the alternative cluster control unit determines whether the restoration of the storage content in the memories 24 of the storage control units belonging to all the alternative storage nodes has been completed. When the processing has been completed for all the memories 24 (step S1410: Yes), the alternative cluster control unit advances the process to step S1411. On the other hand, when the processing has not been completed for all the memories 24 (No in step S1410), the alternative cluster control unit returns the process to step S1403. In step S1403 in which the processing is returned from step S1410, the failure detection cluster control unit repeats the processing in steps S1403 to S1410 until the determination result in step S1410 is Yes while sequentially switching the failure-occurring redundancy group selected in S1403.

Next, in step S1411, the alternative cluster control unit activates each storage control unit 31 in the alternative storage node as an alternative storage control unit that substitutes for the failure storage control unit. Then, the alternative cluster control unit updates the state of each storage node 10 in the storage node management table 45, and updates the state of each storage control unit 31 in the storage control unit management table 46.

<Valid Log Selection Process According to First Embodiment>

Figure 15:
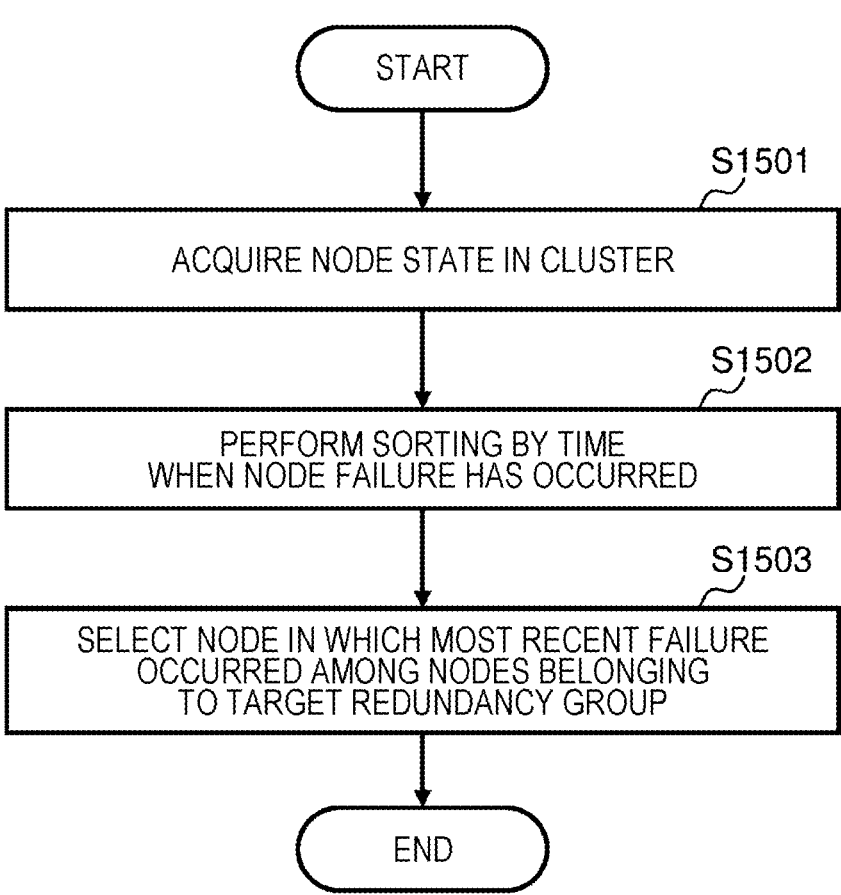
FIG. 15 is a flowchart of a valid log selection process according to the first embodiment.

FIG. 15 is a flowchart of a valid log selection process according to the first embodiment. The valid log selection process is a process of selecting the storage node 10 associated with the "valid log" of the designated redundancy group 50. As described above, the "valid log" refers to the log 60 including the latest memory update content of the storage control unit 31 belonging to the designated redundancy group 50. On the other hand, when the storage node 10 cannot write the log 60 due to a factor such as a storage node failure, the log 60 associated with the storage node 10 does not include the latest memory update content. Such a log 60 is referred to as an "invalid log".

When all the storage control units 31 of a certain redundancy group 50 stop operating due to a factor such as a storage node failure, and the data on the memory 24 is lost, in order to restore the memory content associated with the redundancy group 50, it is necessary to identify to which storage node 10 the storage device 12 including the "valid log" is allocated.

First, in step S1501, the alternative cluster control unit refers to the storage node management table 45 and acquires the state of each storage node 10 in the cluster 15 controlled by its own device.

Next, in step S1502, the alternative cluster control unit sorts the storage nodes 10 in the cluster 15 controlled by its own device by the time when the node failure has occurred. Next, in step S1503, the alternative cluster control unit selects the storage node 10 in which the failure occurred last among the storage nodes 10 belonging to the target redundancy group as the storage node 10 having the "valid log".

Effects of First Embodiment

In the first embodiment, the specific storage node in which the most recent failure has occurred is selected among the storage nodes having the storage control units belonging to the same redundancy group as the failure storage control unit of the failure storage node. Then, the storage content such as cache data and control information are restored in the memory included in the alternative storage node based on the valid log stored in the storage device allocated to the specific storage node. Therefore, it is possible to realize a highly reliable storage system while avoiding the loss of dirty data not stored in the storage device as much as possible and maintaining memory capacity efficiency.

In addition, in the first embodiment, when any of the storage control units 31 belonging to the same redundancy group as the failure storage control unit is normally operating, the storage content is restored in the memory 24 included in the alternative storage node based on the storage content of the memory 24 of the storage control unit 31 that is normally operating. Therefore, it is possible to quickly recover from the failure as compared with the case of restoring the storage content of the memory 24 from the log. Specifically, in a case where the storage system 1 includes a disk array device, it is not necessary to detach and attach the storage device, so that it is possible to recover from the failure more quickly.

First Modification of First Embodiment

For example, a case where the system recovery process described with reference to FIG. 14 is performed by the storage node 10 that has first detected the failure of the failure storage node 10 among the storage nodes 10 constituting the same cluster 15 is described, but the present invention is not limited thereto, and for example, one representative storage node 10 (hereinafter referred to as a "representative storage node") may be selected from the storage nodes 10 constituting the cluster 15, and the selected representative storage node may execute the system recovery process.

In addition, in the system recovery process described with reference to FIG. 7, the storage control units 31 in the active mode are activated in a distribution manner for all the alternative storage nodes (the "storage node Y" and the "storage node X" in FIG. 7) and then used as part of the cluster 15. This method has an advantage that the load can be distributed among the storage nodes 10 when the failure is recovered and the I/O processing is resumed.

However, the present invention is not limited thereto, and after memory content is restored on one alternative storage node ("storage node Y" in FIG. 7), all the storage control units 31 ("storage control unit A" and "storage control unit B" in FIG. 7) in the alternative storage node may be activated in the active mode and used as part of the cluster 15. This method has an advantage that it is possible to recover from the failure more quickly and resume the I/O process on the storage control unit 31. Also in this case, after the storage control units 31 ("storage control unit A" and "storage control unit C" in FIG. 7) of the remaining alternative storage nodes ("storage nodes X" in FIG. 7) are activated in the standby mode, a separate failover process is performed, so that the storage control unit 31 in the active mode can be redisposed between the storage nodes 10, and the load can be distributed among the storage nodes 10. This method can achieve both quick restart of the I/O process on the storage control unit 31 and load distribution between the storage nodes 10.

Second Modification of First Embodiment

For example, in step S708 step S709 in the system recovery process described with reference to FIG. 7, an example is described in which all the storage control units A of the "storage node X" and the "storage node Y" recover the memory data by the log. This method has an advantage that the log recovery process of the storage control unit A can be executed in parallel in each storage node.

However, the present invention is not limited thereto, and at least one storage control unit A may perform memory data recovery using a log, and the remaining storage control units A may perform "memory data recovery from a redundant system". That is, when it is determined that the failure has occurred in all the storage control units belonging to a certain failure-occurring redundancy group, at least one storage control unit among the storage control units in the failure-occurring redundancy group may select the memory data recovery by the log, and the remaining storage control units may select the memory data recovery from the redundant system. This method has an advantage that the number of accesses to the storage device related to the log recovery process and the calculation amount of the CPU can be reduced.

Third Modification of First Embodiment

For example, in the system recovery process described with reference to FIG. 7, a case where the first recovery method or the second recovery method is selected for each failure-occurring redundancy group is described. This method has an advantage that it is possible to quickly recover from the failure by selecting the second recovery method in the failure-occurring redundancy group in which at least one storage control unit is normally operating.

However, the present invention is not limited thereto, and the first recovery method or the second recovery method may be selected for each failure storage node. That is, in the failure detection cluster control unit, when at least one storage control unit among the storage control units belonging to the alternative storage node selects the first recovery method, all the other storage control units belonging to the alternative storage node may select the first recovery method. This method can reduce consumption of network bandwidth associated with memory copy between storage nodes.

Fourth Modification of First Embodiment

For example, in the system recovery process described with reference to FIG. 14, in a case where the second recovery method is selected, data is copied (rebuilding process) to the storage device attached in advance to the alternative storage node. This method has an advantage that the time required for system recovery can be shortened because the number of times of the detach processing and the attach processing of the storage device is small.

However, the present invention is not limited thereto, and in a case where the second recovery method is selected, the storage device of the failure storage node may be selected and detached (step S1404), the detached storage device may be attached to the alternative storage node (step S1405), and data may be copied (rebuilt) to the attached storage device. This method can shorten the time required for rebuilding processing.

Second Embodiment

In the first embodiment, the storage device 12 is attached to a certain storage node 10 and accessed only from the storage node 10. On the other hand, in the second embodiment, the storage device 12 can be accessed from any storage node 10 through the network. In the following description of the second embodiment, differences from the first embodiment will be mainly described, and redundant description of the same configuration and processing will be omitted.

<Configuration of Storage System 1B According to Second Embodiment>

Figure 16:
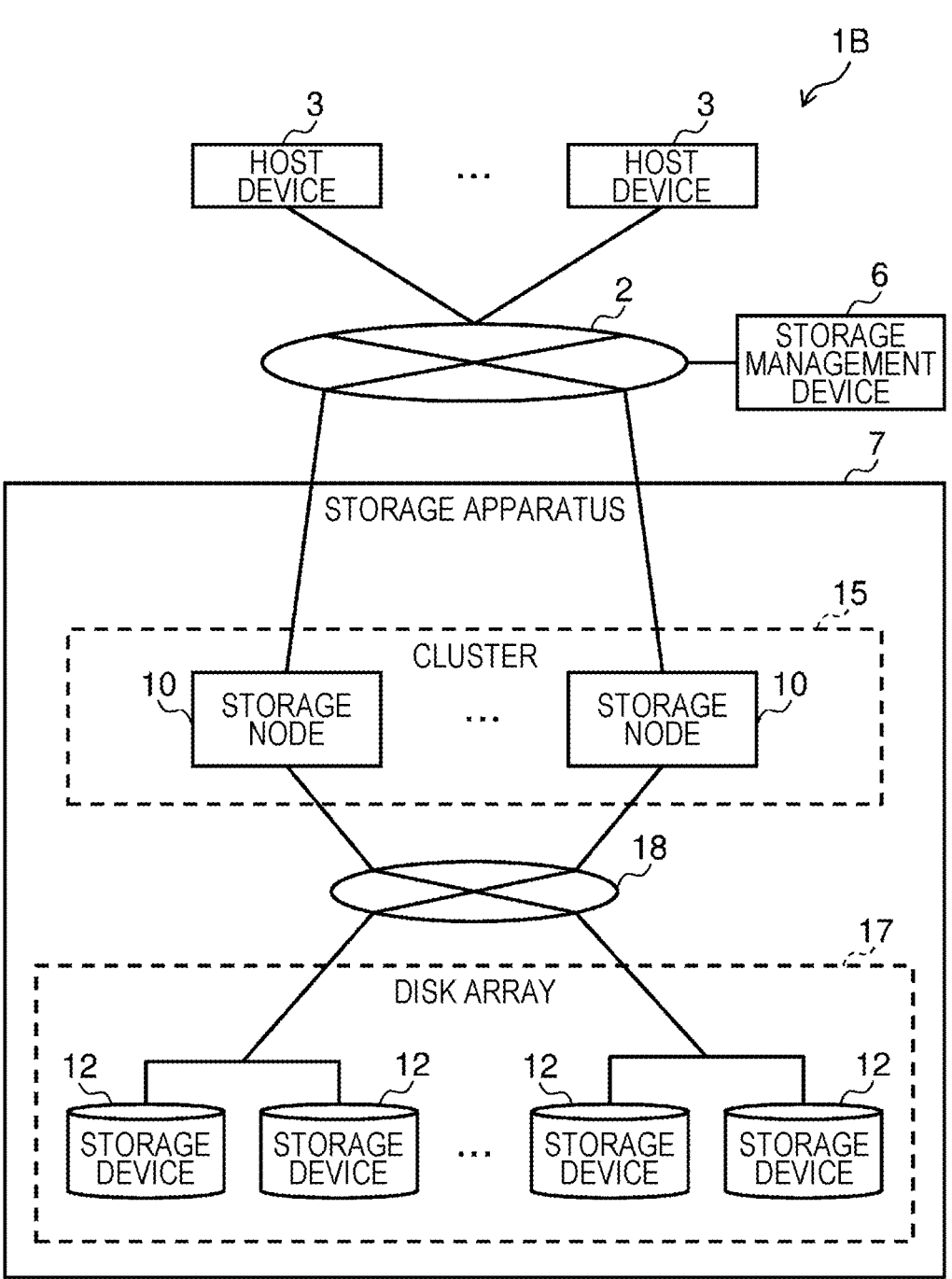
FIG. 16 is a diagram for describing an overall configuration of a storage system according to a second embodiment.

FIG. 16 is a diagram illustrating an overall configuration of a storage system 1B according to the second embodiment. In the present embodiment, unlike the first embodiment, the cloud system 4 is changed to a storage apparatus 7, and the cloud control device 5 is changed to a storage management device 6. This indicates that the present invention can be applied not only to a cloud environment but also to an on-premises environment. That is, the cloud system 4 and the cloud control device 5 in the first embodiment are replaced with the storage apparatus 7 and the storage management device 6, respectively, in the present embodiment.

The storage apparatus 7 includes a cluster 15 including a plurality of storage nodes 10 and a disk array device 17 including a plurality of storage devices 12. In the storage system 1B, each storage node 10 constituting the cluster 15 and each storage device 12 constituting the disk array device 17 are connected to each other via a disk array network 18.

Specifically, the disk array device 17 may include Fabric-attached Bunch of Flash (FBOF), Just a Bunch Of Disks (JBOD), or the like. Further, as in the first embodiment, it may be configured as the block storage providing service unit 13 of the cloud system.

The storage node 10 is a physical or virtual server device that provides a storage area for reading and writing data to the host device 3. In practice, one or a plurality of storage devices 12 in the disk array device 17 is allocated to each storage node 10. Then, the storage node 10 virtualizes the storage area provided by the allocated storage device 12 and provides the storage area to the host device 3.

<Configuration of Storage Node According to Second Embodiment>

Figure 17:
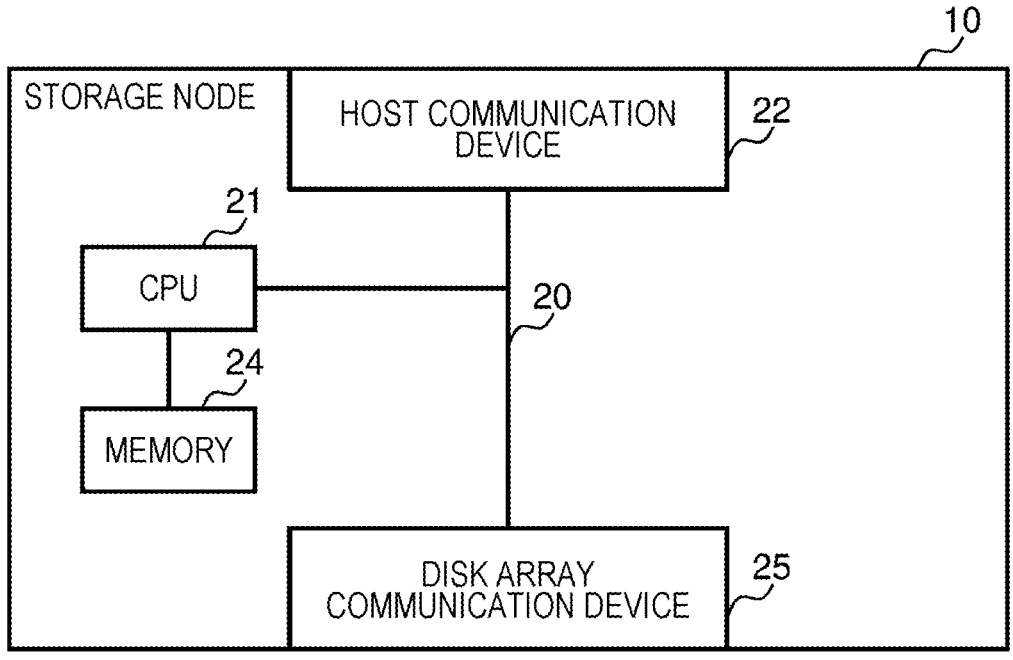
FIG. 17 is a diagram for describing a schematic configuration of a storage node according to the second embodiment.

FIG. 17 is a diagram for describing a schematic configuration of a storage node according to the second embodiment. As illustrated in FIG. 17, the storage node 10 in the present embodiment includes a CPU 21, a host communication device 22, and a disk array communication device 25 connected to each other via an internal network 20, and a memory 24 connected to the CPU 21. Each storage node 10 includes one or more CPUs 21, one or more host communication device 22, one or more disk array communication devices 25, and one or more memories 24.

A difference between the second embodiment (FIG. 17) and the first embodiment (FIG. 2) is that the block storage providing service communication device 23 is changed to the disk array communication device 25. Therefore, the processing performed using the block storage providing service communication device 23 in the first embodiment is replaced with the disk array communication device 25 in the present embodiment.

The disk array communication device 25 is an interface for the storage node 10 to communicate with the storage device 12 in the disk array device 17 via the disk array network 18. The disk array communication device 25 includes, for example, an NIC as in the host communication device 22. The disk array communication device 25 performs protocol control at the time of communication with the storage device 12.

The storage management device 6 is a general-purpose computer device having a function of a system administrator controlling the storage node 10 and the disk array device 17 in the cluster 15 in the storage apparatus 7. The storage management device 6 performs addition, deletion, a configuration change, or the like of the storage node 10, the cluster 15, and the storage device 12 in the disk array device 17 via the network 2 according to an operation by the system administrator. The storage management device 6 may be a physical computer device or a virtual computer device such as a virtual machine.

<System Recovery Process According to Second Embodiment>

Hereinafter, a system recovery process according to the second embodiment will be described with reference to FIGS. 7 and 14. Unlike the first embodiment, the system recovery process according to the second embodiment does not require detaching (step S704 in FIG. 7 and step S1402 in FIG. 14) the storage device 12 of the failure storage node and attaching (step S705 in FIG. 7 and step S1403 in FIG. 14) the storage device 12 to the alternative storage node.

Effects of Second Embodiment

In the present embodiment, when data recovery from the valid log is performed, it is not necessary to replace (detach and attach) the storage device 12 between the storage nodes 10, so that the time required for data recovery from the log can be shortened. Therefore, for example, it is suitable for a configuration in which the time required to replace the storage device 12 is long (for example, an on-premises SDS configuration).

Third Embodiment

In the third embodiment, an object is to maintain reliability after a certain storage node is stopped in response to a maintenance operation or the like on the storage node.

By stopping a certain storage node 10, the redundancy of the storage control unit 31 operating in the storage node 10 (the number of storage nodes in which the storage control unit 31 is made redundant) decreases. For example, in a configuration in which two storage control units 31 belong to a certain redundancy group 50, in a case where one storage node 10 is stopped due to maintenance or the like, the number of operating storage nodes 10 belonging to the same redundancy group 50 as the storage node 10 decreases to one, and thus the reliability of the entire storage system in which one storage node 10 is stopped decreases.

Therefore, in the present embodiment, before the storage node 10 is stopped, each storage control unit 31 belonging to the same redundancy group 50 as the storage node 10 to be stopped is made redundant by using another storage node 10, and then the storage node 10 to be stopped is stopped. As a result, the reliability of the entire storage system can be maintained even when the storage node to be stopped is stopped.

In the present embodiment, when any of the cluster control units 30 constituting the cluster 15 receives a request for maintaining the storage node 10 from the cloud control device 5, a storage node maintenance stop process to be described later is executed.

<Storage Node Maintenance Stop Process According to Third Embodiment>

FIG. 18 is a flowchart of the storage node maintenance stop process according to the third embodiment. The storage node maintenance stop process is executed, for example, every time a stop instruction is input to a target storage node for maintenance of the storage node.

First, in step S1801, the cluster control unit 30 (hereinafter referred to as a "cluster control unit to be maintained") of the storage node 10 to be stopped for maintenance (hereinafter referred to as a "storage node to be stopped") refers to the storage control unit management table 46 and creates a list of the storage control units 31 operating in the storage node to be stopped.

Next, in step S1802, the cluster control unit to be maintained secures the storage node 10 (hereinafter referred to as a "redundancy destination storage node") for constructing a redundant configuration of the storage control unit 31 operating in the storage node to be stopped. Next, in step S1803, the cluster control unit to be maintained makes each storage control unit 31 included in the list created in step S1802 redundant using the "redundancy destination storage node".

Next, in step S1804, the cluster control unit to be maintained starts a process of failover of each storage control unit 31 made redundant in step S1804 (hereinafter referred to as "redundancy target storage control unit") to the "redundancy destination storage node". Specifically, the cluster control unit to be maintained refers to the storage control unit management table 46 (FIG. 5), and changes the state (column 462) of each storage control unit 31 made redundant in step S1804 to "normal (active)".

Next, in step S1805, the cluster control unit to be maintained stops the storage node to be stopped. In addition, the cluster control unit to be maintained updates the storage node management table 45. Specifically, the cluster control unit to be maintained updates the state (column 452) of the stopped storage node 10 to record that the storage node 10 has stopped (for example, update the state to "stopped" or the like). Further, the cluster control unit to be maintained updates the storage control unit management table 46. Specifically, the cluster control unit to be maintained updates the state (column 462) of each storage control unit 31 operating in the stopped storage node 10 to record that the storage control unit is stopped (for example, update the state to "stopped" or the like).

Next, in step S1806, the cluster control unit to be maintained transmits a notification requesting of the cloud control device 5 that the storage device 12 of the storage node 10 to be stopped is taken over by the "redundancy destination storage node". After receiving the notification, the cloud control device 5 performs takeover of the storage device 12 according to the request.

Effects of Third Embodiment

According to the present embodiment, even at the time of maintenance of the storage node 10, the redundancy of each storage control unit 31 in the cluster 15 can be maintained, and the reliability of the cluster can be maintained.

The present invention is not limited to the embodiments described above, but includes various modifications. The above-described embodiments have been described in detail for easy understanding of the present invention, and the present invention is not necessarily limited to embodiments having all the configurations described.

Moreover, it is possible to replace part of the configuration of an embodiment with the configuration of another embodiment, and it is also possible to add the configuration of another embodiment to the configuration of an embodiment. Further, it is possible to add, delete, and replace another configuration with respect to part of the configuration of each embodiment.

Further, part or all of the above-described respective configurations, functions processing units, and the like may be realized by hardware, for example, by designing them with an integrated circuit. Further, the above-described respective configurations, functions, and the like may be realized by software with the processor interpreting and executing programs for realizing the respective functions. Information such as a program, a table, and a file for realizing each function can be stored in a recording device such as a memory, a hard disk, and an SSD, or a recording medium such as an IC card and an SD card.

In addition, the control lines and the information lines indicate what is considered to be necessary for the description, and do not necessarily indicate all the control lines and the information lines on the product. In practice, it may be considered that almost all configurations are connected to each other.

What is claimed is:

1. A storage system comprising:
    a plurality of storage nodes; and
    a plurality of storage devices that provides storage areas to the plurality of storage nodes,
    wherein each of the storage nodes includes:
    a memory that stores cache data related to data read from and written to the storage areas by the storage node,
    a storage control unit that reads and writes the data from and to the storage areas in response to a request from a host device, updates the cache data related to the data in the memory, creates a log related to the cache data, and stores the log in a storage device allocated to the storage node, and
    a cluster control unit that manages a plurality of storage control units in a redundancy group, dispersedly arranges and manages the plurality of storage control units belonging to the same redundancy group in the plurality of storage nodes, and monitors occurrence of a failure in another storage node,

22 the storage control units belonging to the same redundancy group synchronize the cache data stored in the memory,
a failure detection cluster control unit that is a cluster control unit that has detected the occurrence of the failure in the other storage node requests an external control device to create an alternative storage node that is a storage node that substitutes for a failure storage node that is the storage node in which the failure has occurred,
the failure detection cluster control unit executes a detach process of separating a storage device allocated to the failure storage node from the failure storage node, then requests the control device to execute an attach process of allocating the storage device separated from the failure storage node to the alternative storage node, and
an alternative cluster control unit that is a cluster control unit included in the alternative storage node selects a specific storage node in which a most recent failure has occurred among the storage nodes including the storage control units belonging to the same redundancy group as a failure storage control unit included in the failure storage node, selects and executes, based on a log stored in a storage device allocated to the specific storage node, a first recovery method of restoring storage content in a memory included in the alternative storage node, and
activates an alternative storage control unit that is a storage control unit substituting for the failure storage control unit in the alternative storage node.

2. The storage system according to claim 1, wherein
the memory stores control information related to the storage control unit,
the log includes a log related to the control information, and
the storage control unit
updates the control information in the memory, creates the log related to the control information, and stores the log related to the cache data and the log related to the control information in the storage device allocated to the storage node.

3. The storage system according to claim 1, wherein
the failure detection cluster control unit:
determines whether a failure has occurred in all the storage control units belonging to the same redundancy group as the failure storage control unit, and
when it is determined that a failure has occurred in all the storage control units belonging to the same redundancy group as the failure storage control unit, the alternative cluster control unit selects and executes the first recovery method, and
when it is determined that any of the storage control units belonging to the same redundancy group as the failure storage control unit is normally operating, the alternative cluster control unit selects and executes, instead of the first recovery method, based on storage content stored in a memory of a storage node including a storage control unit that is normally operating and belonging to the same redundancy group as the failure storage control unit, a second recovery method of restoring the storage content in the memory included in the alternative storage node.

4. The storage system according to claim 1, further comprising a disk array device that includes the plurality of storage devices, wherein the plurality of storage nodes and the disk array device are connected to each other via a predetermined network, and the detach process and the attach process include deletion, addition, or a configuration change of the storage devices in the disk array device based on control from a management device of the storage system via the predetermined network.

5. The storage system according to claim 1, wherein a cluster control unit included in a target storage node to which a stop instruction has been input creates a list of storage control units to be made redundant operating in the target storage node, secures a redundancy destination storage node that makes the target storage node redundant, and makes the storage control units to be made redundant in the redundancy destination storage node, and executes a detach process of separating a storage device allocated to the target storage node from the target storage node, and then requests the control device to execute an attach process of allocating the storage device separated from the target storage node to the redundancy destination storage node.

6. The storage system according to claim 1, wherein the alternative cluster control unit activates all alternative storage control units to be in an active mode out of an active mode and a standby mode in the redundancy group so that all the alternative storage control units of each of the plurality of storage nodes are distributedly disposed in all the alternative storage nodes of each of the plurality of storage nodes.

7. The storage system according to claim 1, wherein the alternative cluster control unit activates all alternative storage control units of each of the plurality of storage nodes to be in an active mode out of an active mode and a standby mode in the redundancy group so that all the alternative storage control units of each of the plurality of storage nodes are centrally disposed in some of the alternative storage nodes of the plurality of storage nodes.

8. The storage system according to claim 7, wherein the alternative cluster control unit activates all alternative storage control units to be in the active mode so that all the alternative storage control units are centrally disposed in some of the alternative storage nodes, and then redisposes all the alternative storage control units to be in the active mode so that all the alternative storage control units are distributed to all the alternative storage nodes.

9. A failure handling method in a storage system executed by a storage system including a plurality of storage nodes and a plurality of storage devices that provide storage areas to the plurality of storage nodes, each of the storage nodes including a memory that stores cache data related to data read from and written to the storage areas by the storage node, a storage control unit that reads and writes the data from and to the storage areas in response to a request from a host device, updates the cache data related to the data in the memory, creates a log related to the cache data, and stores the log in a storage device allocated to the storage node, and a cluster control unit that manages a plurality of storage control units in a redundancy group, dispersedly arranges and manages the plurality of storage control units belonging to the same redundancy group in the plurality of storage nodes, and monitors occurrence of a failure in another storage node, the failure handling method comprising:

the storage control units belonging to the same redundancy group synchronizing the cache data stored in the memory, a failure detection cluster control unit that is a cluster control unit that has detected the occurrence of the failure in the other storage node requesting an external control device to create an alternative storage node that is a storage node that substitutes for a failure storage node that is the storage node in which the failure has occurred;

an alternative cluster control unit that is a cluster control unit included in the alternative storage node executing a detach process of separating a storage device allocated to the failure storage node from the failure storage node, then requesting the control device to execute an attach process of allocating the storage device separated from the failure storage node to the alternative storage node, selecting a specific storage node in which a most recent failure has occurred among the storage nodes including the storage control units belonging to the same redundancy group as a failure storage control unit included in the failure storage node, selecting and executing, based on a log stored in the storage device allocated to the specific storage node, a first recovery method of restoring storage content in a memory included in the alternative storage node; and activating an alternative storage control unit that is a storage control unit substituting for the failure storage control unit in the alternative storage node.

* * * * *